(12) United States Patent
Reid, Jr. et al.

(10) Patent No.: US 6,303,065 B1
(45) Date of Patent: Oct. 16, 2001

(54) METHOD AND APPARATUS FOR MAKING MULTI-LAYERED CORES OR GOLF BALLS

(75) Inventors: Walter L. Reid, Jr., Mattapoisett, MA (US); Stephen K. Scolamiero, Bristol, RI (US); Thomas E. Moore, Foxboro, MA (US); John W. Kennedy, Cohasset, MA (US); Steven Earle, Plympton, MA (US); Daniel Ditzel, Hanover, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/375,382

(22) Filed: Aug. 17, 1999

(51) Int. Cl.$^7$ .................................................. B29C 45/14
(52) U.S. Cl. .......................... 264/248; 264/250; 264/255; 264/279.1; 264/297.7; 264/297.8; 425/451; 425/515; 425/517
(58) Field of Search ................................ 264/248, 279.1, 264/250, 297.5, 297.7, 297.8, 255; 425/234, 517, 515, 451

(56) References Cited

U.S. PATENT DOCUMENTS

| | | | |
|---|---|---|---|
| 3,933,967 | * 1/1976 | Taylor | 264/248 |
| 4,744,741 | 5/1988 | Glover et al. | |
| 5,683,312 | 11/1997 | Boehm et al. | |
| 6,096,255 | 8/2000 | Brown et al. | |

* cited by examiner

*Primary Examiner*—Jan H. Silbaugh
*Assistant Examiner*—Edmund H. Lee
(74) *Attorney, Agent, or Firm*—Pennie & Edmonds LLP

(57) ABSTRACT

The present invention is directed to an automated molding machine and method for forming hemispherical components for a golf ball. The machine includes an L-shaped frame and three separate plates. The plates move between longitudinally spaced positions and vertically spaced positions. The machine also includes a rotating frame for inverting several of the plates during manufacture.

24 Claims, 18 Drawing Sheets

METHOD AND APPARATUS FOR MAKING MULTI-LAYERED CORES OR GOLF BALLS

TECHNICAL FIELD OF THE INVENTION

The present invention is directed to a method and apparatus for making golf balls. More particularly, the invention is directed to a method and apparatus for forming multi-layered cores or golf balls that are substantially automated.

BACKGROUND OF THE INVENTION

Generally, golf balls have been classified as solid balls or wound balls. Solid balls are generally comprised of a solid polymeric core and a cover. These balls are generally easy to manufacture, but are regarded as having limited playing characteristics. Wound balls are comprised of a solid or liquid-filled center surrounded by tensioned elastomeric material and a cover. Wound balls generally have good playing characteristics, but are more difficult to manufacture than solid balls.

The prior art is comprised of various golf balls that have been designed to provide optimal playing characteristics. These characteristics are generally the initial velocity and spin of the golf ball, which can be optimized for various players. For instance, certain players prefer to play a ball that has a high spin rate for playability. Other players prefer to play a ball that has a low spin rate to maximize distance. However, these balls tend to be hard feeling and difficult to control around the greens.

Manufacturers have molded layers around a solid center by placing a preformed center between two blocks of core material in a spherical compression mold, and closing the mold. This process, however, provides little control over the ultimate placement of the center within the golf ball core. Large variations in the location of the center can result.

The prior art also provides for the manufacture of double cover golf balls. This is generally accomplished by injection molding a first and then a second cover layer around a core. This system, however, requires complex injection molds, usually with retractable pins within the mold to properly position the core. Moreover, this system generally works better with thermoplastic materials.

Therefore, what is desired is a method and apparatus for molding multi-layer cores or multi-layer covers that ensures properly centered balls.

SUMMARY OF THE INVENTION

According to the present invention a method and an apparatus for making a core and/or golf ball are disclosed. The method for forming cores comprises the steps of providing center, providing a plurality of mold plates, and forming a plurality of core hemispherical shells from elastomeric material. The mold plates include a bottom mold plate defining a plurality of cavities, a top mold plate defining a plurality of corresponding cavities, and a center mold plate including a plurality of corresponding protrusions.

The step of forming the hemispherical shells further includes placing elastomeric material in the cavities of the bottom mold plate and the top mold plate, locating the top mold plate between the center and bottom mold plates so that the cavities in the top mold plate are adjacent to the center mold plate and the three mold plates are vertically aligned, rotating the center mold plate and the top mold plate together until the center mold plate is between the top and bottom mold plates, and applying heat and pressure to the three mold plates to form the elastomeric material into the shells in the bottom and top mold plate cavities.

The method further includes rotating the center mold plate and the top mold plate together until the top mold plate is between the center and bottom mold plates, placing the centers in the shells in the bottom mold plate, rotating the top mold plate with the shells therein until the cavities in the top mold plate are adjacent to the centers in the bottom mold plate, and applying heat and pressure to the top and bottom mold plates to join the shells around the centers to form the cores.

In one embodiment, the method includes moving the top and center mold plates vertically before and after rotating.

The method of making a ball, comprises providing cores and the top, bottom and center mold plates. Then a plurality of cover hemispherical shells are formed from a first cover material. The cover shells are formed by placing the first cover material in the cavities of the bottom mold plate and the top mold plate; locating the top mold plate between the center and bottom mold plates so that the cavities in the top mold plate are adjacent to the center mold plate and the top, center and bottom mold plates are vertically aligned; rotating the center mold plate and the top mold plate together until the center mold plate is between the top and bottom mold plates; and applying heat and pressure to the three mold plates to form the first cover material into the shells in the bottom and top mold plate cavities. Next, the center mold plate and the top mold plate are rotated together until the top mold plate is between the center and bottom mold plates. The cores are placed in the shells in the bottom mold plate, the top mold plate is rotated until the cavities in the top mold plate are adjacent to the centers in the bottom mold plate, heat and pressure are applied to the top and bottom mold plates to join the shells around the cores to form an assembly, and a second cover material is molded around the assembly.

The apparatus for molding the golf balls includes the bottom, top, and center mold plates. The apparatus further includes first, second, and third frames. The first frame extends substantially horizontally, defines a lower position, and has the bottom and top mold plates slidably and releasably coupled thereto. The second frame extends substantially vertically and is aligned with the first frame. The second frame also defines a rotate position spaced above the lower position and an elevated position spaced above the rotate position. The third or rotating frame is rotatably connected to the second frame at the rotate position. At least one of the top and center mold plates are releasably coupled to the third frame to rotate the associated mold plate.

In another embodiment, the apparatus further includes a lower elevator and an upper elevator. The lower elevator moves at least one plate between the lower position and the rotate position. The upper elevator moves the center mold plate between the elevated position and the rotate position.

In yet another embodiment, the apparatus also includes a mold press disposed adjacent to the first frame for applying heat and pressure to at least two of the mold plates.

DETAILED DESCRIPTION OF THE PREFERRED EMBODIMENTS

Figure 1:
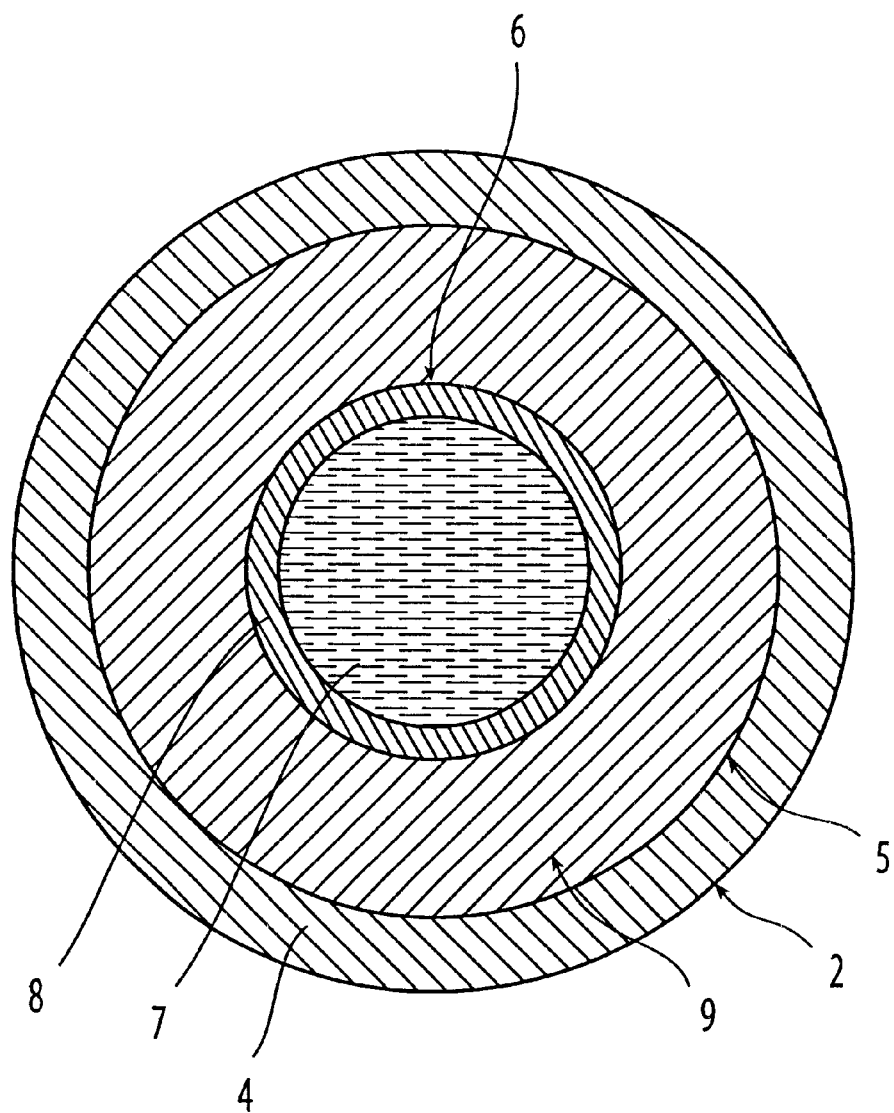
FIG. 1 is a cross-sectional view of a liquid-filled ball formed using the method and apparatus of the present invention.

Referring to FIG. 1, ball 2 includes a cover 4 surrounding a core 5. The core 5 has a center or inner core 6 that is disposed concentrically within the cover and is a fluid center 7 in a cavity within an inner layer 8. The core 5 also has an outer core 9, which surrounds the center 6.

Figure 2:
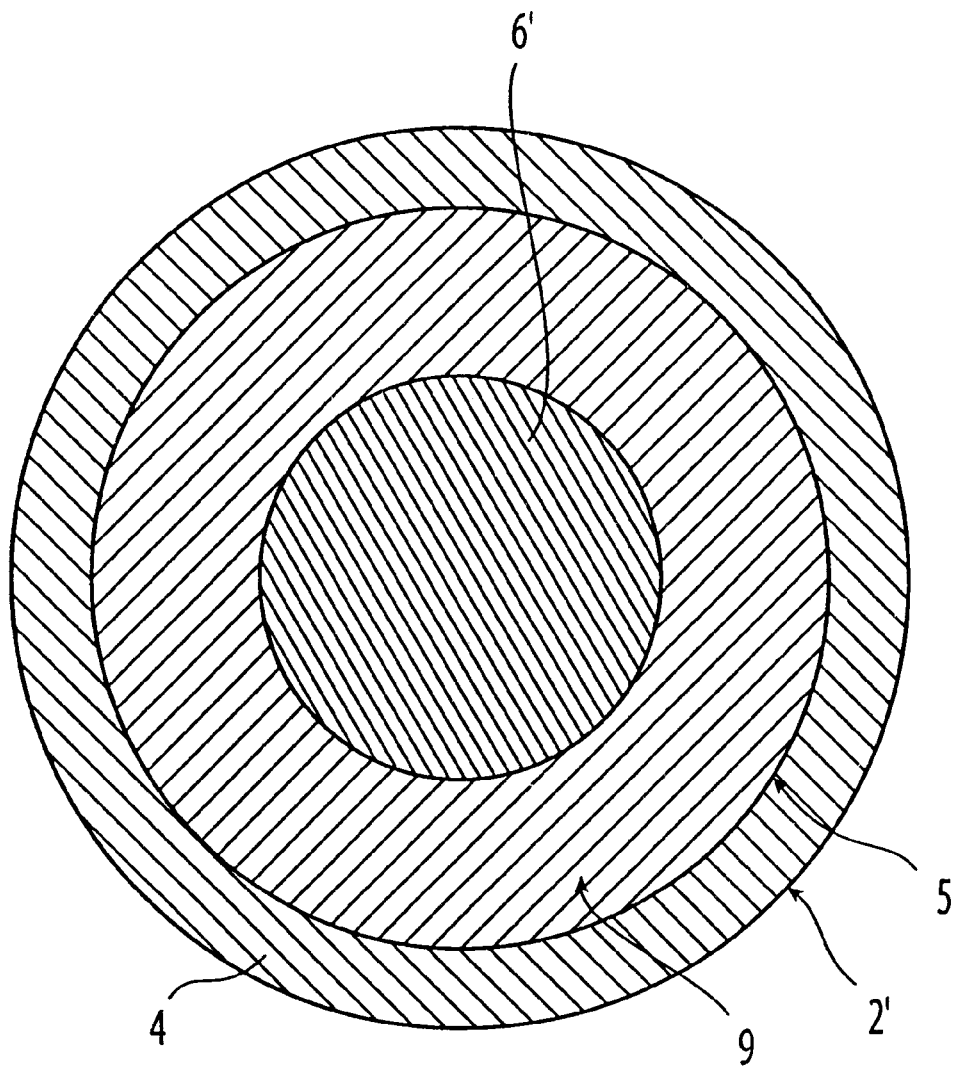
FIG. 2 is a cross-sectional view of a solid ball formed using the method and apparatus of the present invention.

Referring to FIG. 2, ball 2' includes a cover 4 surrounding a core 5. The core 5 has a center or inner core 6' that is disposed concentrically within the cover, and which comprises a solid sphere, as set forth below. The core 5 also has an outer core 9, which surrounds the center 6'.

The cover 4 provides the interface between the ball 2 or 2' and a club and other objects such as trees, cart paths, and grass. Properties that are desirable for the cover are good moldability, high abrasion resistance, high tear strength, high resilience, and good mold release, among others.

The cover 4 can be comprised of polymeric materials such as ionic copolymers of ethylene and an unsaturated monocarboxylic acid, which are available under the trademark "SURLYN" of E.I. DuPont De Nemours & Company of Wilmington, Del. or "IOTEK" or "ESCOR" from Exxon. These are copolymers or terpolymers of ethylene and methacrylic acid or acrylic acid partially neutralized with zinc, sodium, lithium, magnesium, potassium, calcium, manganese, nickel or the like.

In accordance with the preferred balls, the cover 4 has a thickness to generally provide sufficient strength, good performance characteristics and durability. Preferably, the cover 4 is of a thickness from about 0.03 inches to about 0.12 inches. More preferably, the cover 4 is about 0.04 to 0.09 inches in thickness and, most preferably, is about 0.05 to 0.085 inches in thickness.

In one preferred embodiment, the cover 4 can be formed from mixtures or blends of zinc, lithium and/or sodium ionic copolymers or terpolymers.

The Surlyn® resins for use in the cover 4 are ionic copolymers or terpolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This invention can likewise be used in conjunction with homopolymeric and copolymer materials such as:

(1) vinyl resins such as those formed by the polymerization of vinyl chloride, or by the copolymerization of vinyl chloride with vinyl acetate, acrylic esters or vinylidene chloride.

(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst.

(3) Polyurethanes such as those prepared from polyols and diisocyanates or polyisocyanates and those disclosed in U.S. Pat. No. 5,334,673.

(4) Polyureas such as those disclosed in U.S. Pat. No. 5,484,870.

(5) Polyamides such as poly(hexamethylene adipamide) and others prepared from diamines and dibasic acids, as well as those from amino acids such as poly (caprolactam), and blends of polyamides with Surlyn, polyethylene, ethylene copolymers, ethyl-propylene-non-conjugated diene terpolymer, etc.

(6) Acrylic resins and blends of these resins with poly vinyl chloride, elastomers, etc.

(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly (etheramide), such as PEBAX sold by ELF Atochem.

(8) Polyphenylene oxide resins, or blends of polyphenylene oxide with high impact polystyrene as sold under the trademark "Noryl" by General Electric Company, Pittsfield, Mass.

(9) Thermoplastic polyesters, such as polyethylene terephtha late, polybutylene terephtha late, polyethylene terephthalate/glycol modified and elastomers sold under the trademarks "Hytrel" by E.I. DuPont De Nemours & Company of Wilmington, Del. and "Lomod" by General Electric Company, Pittsfield, Mass.

(10) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers. Blends of thermoplastic rubbers with polyethylene, propylene, polyacetal, nylon, polyesters, cellulose esters, etc.

Preferably, the cover 4 is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly (ethylene terephthalate), poly (butylene terephthalate), poly (ethylene vinyl alcohol), poly (tetrafluoroethylene) and their copolymers including functional comonomers and blends thereof. Still further, the cover 4 is preferably comprised of a polyether or polyester thermoplastic urethane, a thermoset polyurethane, a low modulus ionomer such as acid-containing ethylene copolymer ionomers, including E/X/Y terpolymers where E is ethylene, X is an acrylate or methacrylate-based softening comonomer present in 0–50 weight percent and Y is acrylic or methacrylic acid present in 5–35 weight percent. More preferably, in a low spin rate embodiment designed for maximum distance, the acrylic or methacrylic acid is present in 15–35 weight percent, making the ionomer a high modulus ionomer. In a high spin embodiment, the acid is present in 10–15 weight percent or a blend of a low modulus ionomer with a standard ionomer is used.

The outer core 9 is preferably made of thermoset rubber base materials, including those conventionally employed in golf ball cores. The conventional materials for such cores include compositions having a base rubber, a crosslinking agent, a filler and a co-crosslinking agent. The base rubber is typically a synthetic rubber like 1,4-polybutadiene having a cis-structure of at least 40%. Natural rubber, polyisoprene rubber and/or styrene butadiene rubber may optionally be added to the 1,4-polybutadiene. The initiator included in the core composition can be any polymerization initiator which decomposes during the cure cycle. The crosslinking agent includes a metal salt of an unsaturated fatty acid such as sodium, zinc, lithium or magnesium salt or an unsaturated fatty acid having 3 to 8 carbon atoms such as acrylic or methacrylic acid. The filler typically includes materials such as zinc oxide, barium sulfate, silica, calcium carbonate, zinc carbonate, regrind and the like.

Alternatively, the outer core 9 may be comprised of thermoplastic elastomers such as a thermoplastic polyesterester, thermoplastic polyetherester, dynamically vulcanized thermoplastic elastomers, functionalized styrene-butadiene elastomers, thermoplastic urethanes or metallocene polymers or blends thereof.

The present invention is not limited to a particular outer core 9 material, and the materials are well known to those of ordinary skill in the art. The present invention is generally directed to the use of a standard thermoset material, but those of ordinary skill will easily know how to convert the process for using thermoplastic materials.

The outer core 9 preferably has an outside diameter in the range of 80 to 98% of the finished ball diameter and an inner diameter in the range of 30 to 90% of the finished ball diameter. Preferably, the outer core 9 has an inner diameter of approximately 0.8 to 1.5 inches and, more preferably, the inner diameter is approximately 1.0 to 1.5 inches. Yet further still, the outer core 16 has an outside diameter in the range of 1.3 to 1.7 inches and, more preferably, approximately 1.5 to 1.6 inches.

A golf ball incorporating these measurements can be designed with the various attributes discussed below, such as specific gravity, resiliency and hardness, to provide the desired playing characteristics, such as spin rate and initial velocity.

Figure 3:
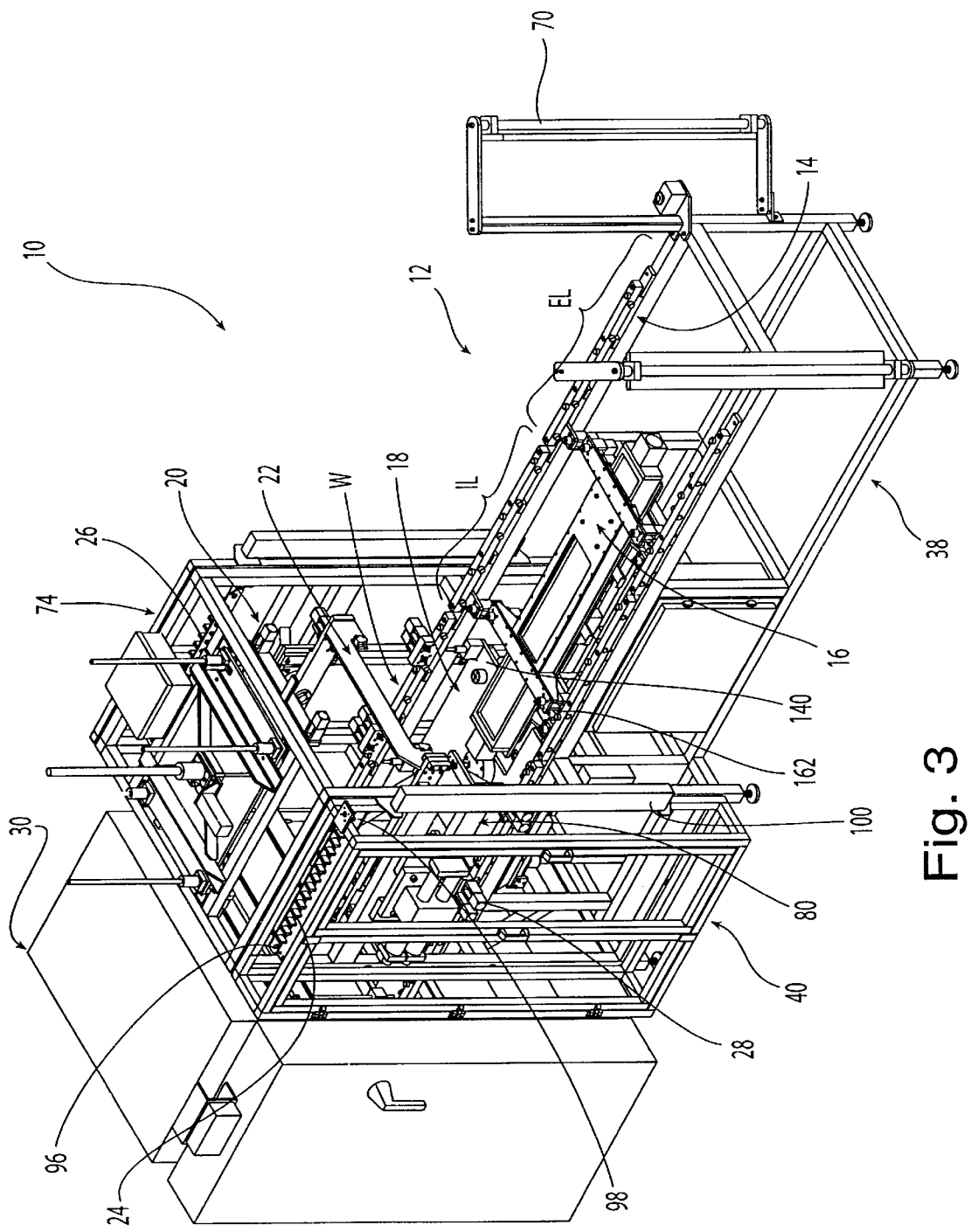
FIG. 3 is a perspective view of a molding apparatus according to the present invention.
Figure 4:
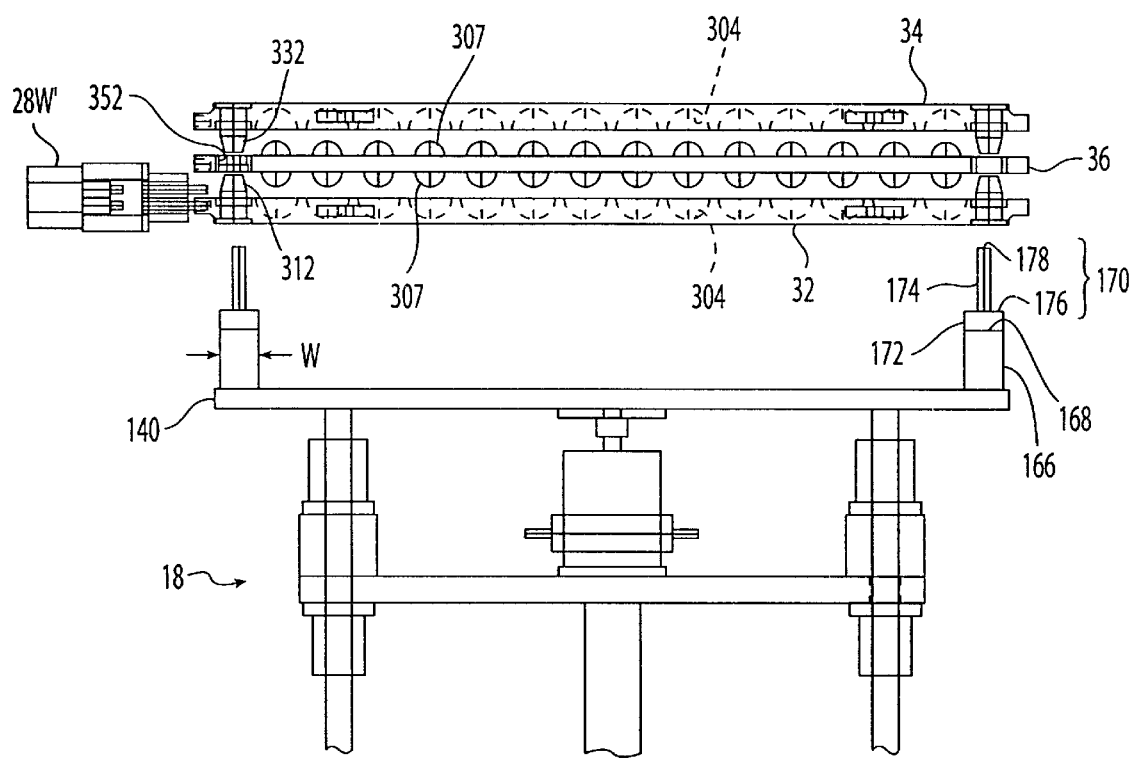
FIG. 4 is an enlarged, side view of a lower elevator assembly prior to engaging a bottom mold plate.

Referring to FIG. 3, the method for making golf balls of the present invention uses a molding apparatus 10. The molding apparatus 10 includes a frame assembly 12, a guide assembly 14, a slide assembly 16, a lower elevator assembly 18, an upper elevator assembly 20, a rotating assembly 22, a light source 24, sensors 26, a plurality of lock assemblies 28, controls (not shown), and a mold press 30. Preferably a combination of pneumatic, electrical, and computerized systems are used to control the operation of the apparatus, however any conventional manufacturing controls known to those skilled in the art can be used to control the apparatus operation. Referring to FIG. 4, the molding apparatus 10 further includes a bottom mold plate 32, a top mold plate 34, and a center mold plate 36.

Figure 5:
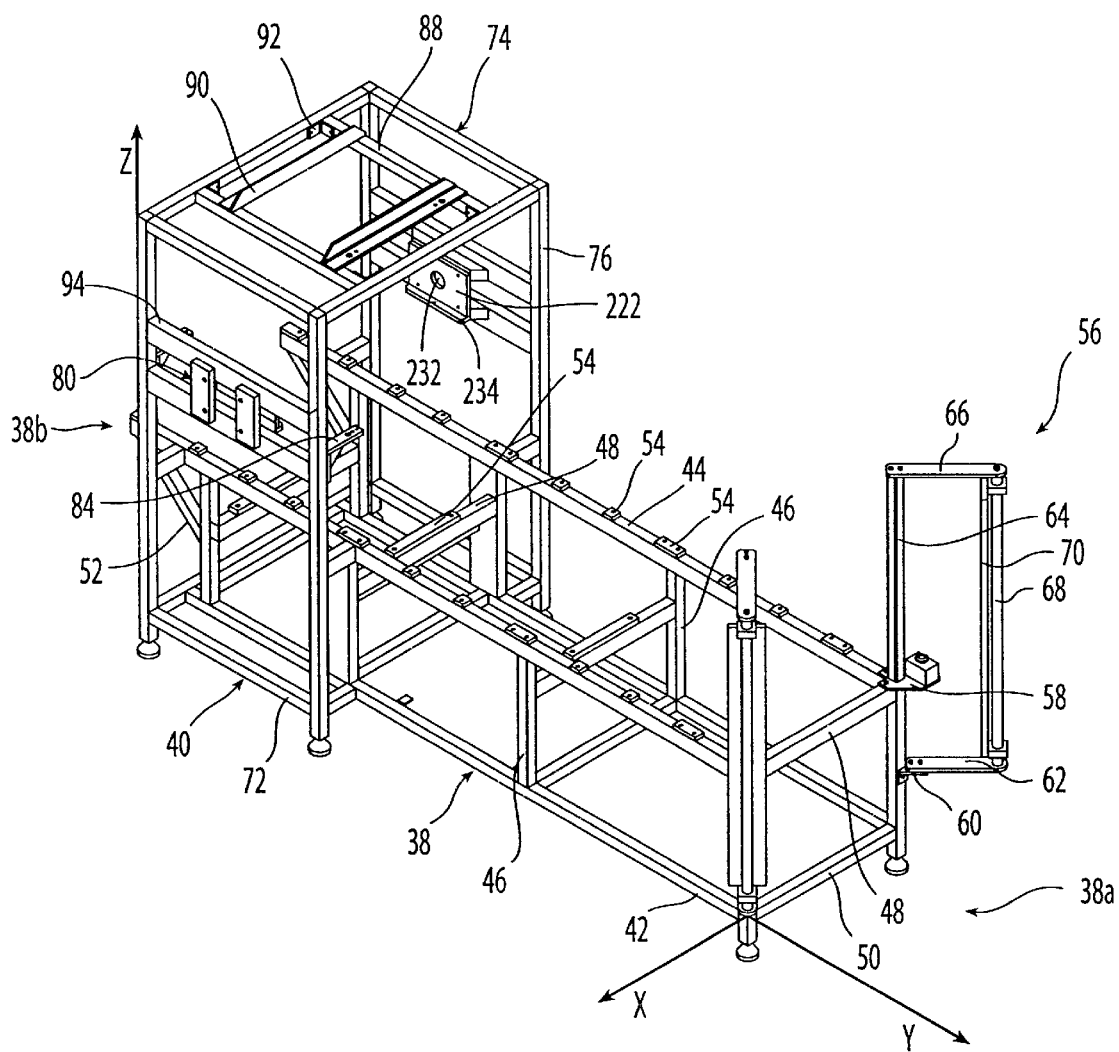
FIG. 5 is a perspective view of a frame assembly of the apparatus of FIG. 3.

Referring to FIG. 5, the frame assembly 12 includes two frame sections 38 and 40 joined to form a substantially L-shaped frame. Reference is made to a three-dimensional Cartesian Coordinate system including perpendicular x, y, and z axes or directions. The frame sections 38 and 40 include elongated members that form rectangular three-dimensional boxes. The first frame section or slide frame 38 is elongated more in the y-direction than in the x- and z-directions, so the slide frame 38 extends substantially horizontally and longitudinally. The second frame section or elevator frame 40 is elongated more in the z-direction than in the x- and y-directions, so that the elevator frame extends substantially vertically.

Referring to FIG. 5, the slide frame 38 has a first end 38a, a spaced second end 38b, and further includes a pair of lower longitudinal members 42, a pair of upper longitudinal members 44, four pairs of vertical members 46, four upper transverse members 48, four lower transverse members 50, and a pair of inclined members 52.

The pair of upper longitudinal members 44 are longer than the pair of lower longitudinal members 42 such that the upper pair 44 extend beyond the lower pair 42 at the second end 38b of the slide frame 38.

The pairs of vertical members 46 join the lower and upper longitudinally extending members 42 and 44. Each pair of vertical members 46 are spaced longitudinally from the adjacent pair.

The upper transverse members 48 extend between the upper longitudinal members 44. The lower transverse members 50 extend between the lower longitudinal members 42. Each inclined member 52 extends from the center of the associated vertical member 46 at the second end 38b to the second end 38b of the upper longitudinal member 44.

The upper longitudinal members 44 and the three upper transverse members 48 closest to the second end 38b include spaced frame pads 54 of various sizes attached to the upper surfaces thereof. The various sized pads define either one or two holes, which extend through the entire pad to enable mounting of the guide assembly 14 (as shown in FIG. 3) on the upper surface of the pads using conventional fasteners.

The slide frame 38 further includes two reflector assemblies 56 attached thereto at the first end 38a. Each reflector assembly 56 includes an upper mount plate 58, a lower mount plate 60, a lower mount member 62, a vertical member 64, an upper mount member 66, a tubular member 68, and a mirror 70.

The upper mount plate 58 is coupled to the upper corner of the slide frame 38 above the vertical member 46 at the first end 38a. The lower mount plate 60 is coupled to the center of the vertical member 46 at the first end 38a. The lower mount member 62 is coupled to and horizontally extends from the lower mount plate 60. The vertical member 64 extends vertically from the upper surface of the upper mount plate 58. The upper mount member 66 is coupled to and horizontally extends from the vertical member 64. The lower and upper mount members 62 and 66 are parallel to one another and extend away from the first end 38a of the slide frame 38. The tubular member 68 extends between the lower and upper mount members 62 and 66. The lower and upper mount plates 58 and 60, mount members 62 and 66, the vertical member 64 and the tubular member 68 are joined together using conventional fasteners. The mirror 70 is rotatably mounted to the tubular member 68.

Referring again to FIG. 5, the elevator frame 40 is aligned with the slide frame 38, and includes a lower rectangular frame 72, a spaced upper rectangular frame 74, a plurality of vertical members 76, a rotating assembly mount frame 80, and a light source/receiver unit 82 (as shown in FIG. 3).

Referring to FIG. 5, the lower rectangular frame 72 is coupled to the lower longitudinal members 42 of the slide frame 38. The elevator frame 40 supports the slide frame 38 that extends therethrough. The vertical members 76 join the lower and upper frames 72 and 74 of the elevator frame 40. One vertical member 76 connects each corner of the lower frame 72 to each corner of the upper frame 74.

Figure 10:
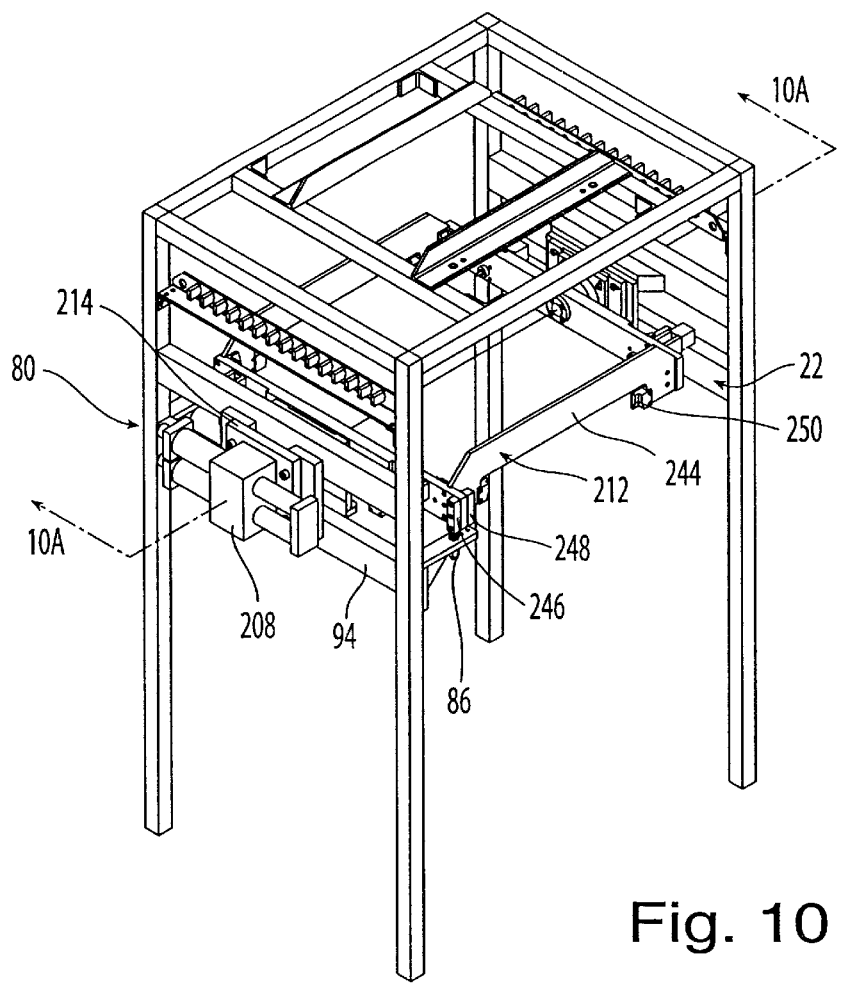
FIG. 10 is a partial enlarged, perspective view of a portion of the frame assembly shown in FIG. 3.

At least one of the vertical members 76 includes a bracket 84 that is attached thereto. The bracket 84 supports a hydraulic cushion 86 (as shown in FIG. 10) that is attached thereto.

The upper rectangular frame 74 further includes two pairs of upper elevator support members 88 and 90. The support members 88 extend longitudinally and are spaced apart. The first pair of upper elevator support members 88 is connected to the upper rectangular frame 74 by brackets 92. The support members 90 extend transversely between the first pair of upper elevator support members 88.

The rotating assembly mount frame 80 includes two pairs of longitudinally extending mount members 94. The members 94 extend between the vertical support members 76, respectively. The mount members 94 are vertically positioned between the slide frame 38 and the upper frame 74.

Referring to FIG. 3, a pair of sensor array supports 96 extend longitudinally between the vertical members 76. The supports 96 are located on the upper end of the elevator frame 40 between the rotating assembly mount frame 80 and the upper frame 74. Each sensor array support 96 is secured to the elevator frame 40 by brackets 98, which are mounted to the vertical members 76.

Referring to FIG. 3, one light source/receiver unit 100 is attached to each of the vertical support members 76 closest to the slide frame first end 38a. Each unit 100 produces a light beam that travels the longitudinal length of the slide frame 38 toward the mirror 70. Each unit 100 is in electronic communication with the controls. The mirror 70 reflects the beam of light back toward the unit 100.

When the unit 100 receives the light, a circuit is completed. If the light path from the mirror 70 to the unit 100 is obstructed, the circuit will not be completed. An incomplete circuit causes a signal to be sent to the controls from the unit 100. The signal prevents movement of various parts of the apparatus along the slide frame 38.

Figure 6:
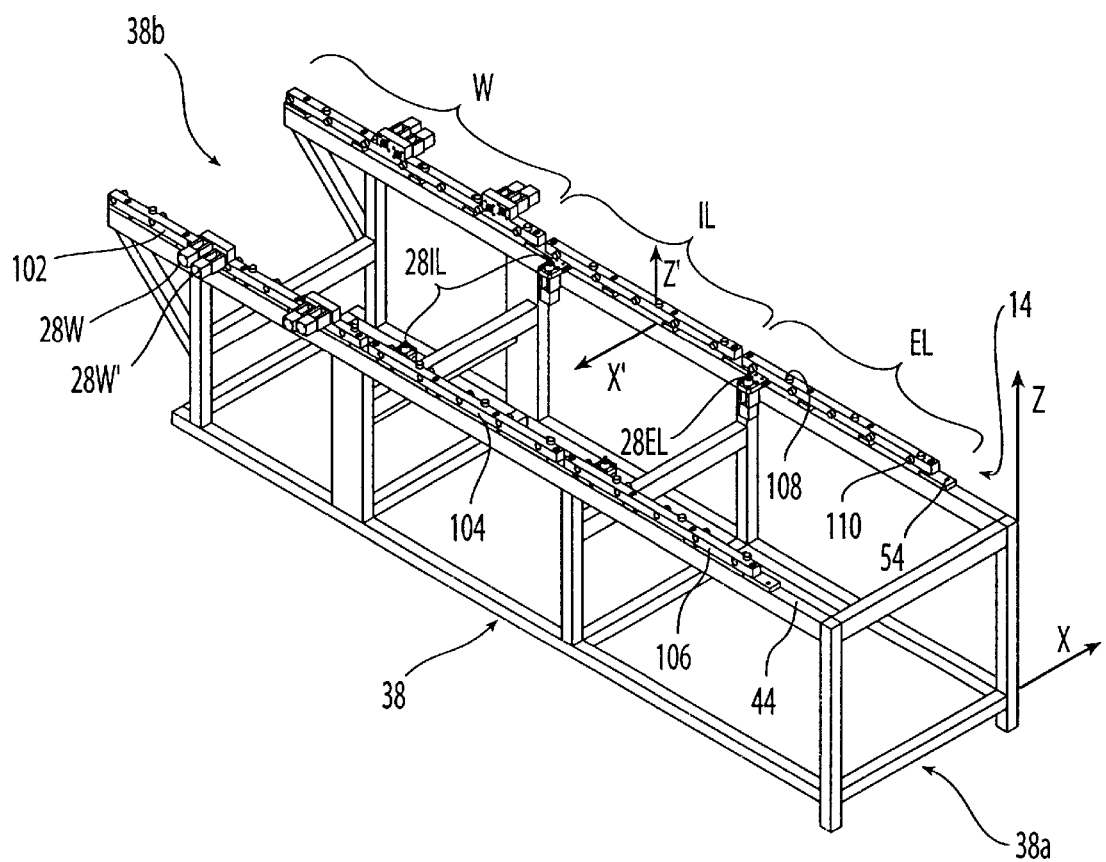
FIG. 6 is an enlarged, perspective view of a guide assembly on the frame assembly of FIG. 5.

Referring to FIG. 6, the guide assembly 14 includes three pairs of guide blocks 102–106 mounted to the upper surface of the upper longitudinal members 44 of the slide frame 38 on the pads. The first pair of guide blocks 102 closest to the second end 38b of the slide frame 38 defines a working station W. The second pair of guide blocks 104 defines an intermediate loading station IL. The third pair of guide blocks 106 defines an end loading station EL.

Each guide block 102–106 is a rectangular track with two sets of cam-follower bearings 108 and 110. In the first set, the cam-follower bearings 108 are rotatably coupled to the upper surface of each guide block. Cam-follower bearings 108 rotate about an axis z' that is parallel to the z-axis. In the second set, the cam-follower bearings 110 are rotatably coupled to the inner, side surface of each guide block. Cam-follower bearings 110 rotate about an axis x' that is parallel to the x-axis. During operation, the second set of cam-follower bearings 110 support the mold plates thereon, and the first set of cam-follower bearings 108 prevent the mold plates from moving in the transverse, or x-direction.

The first pair of guide blocks 102 further includes two sets of working station lock assemblies 28W and 28W' coupled thereto that secure various mold plates in the working station W. The lock assemblies 28W and 28W' are coupled to the first pair of guide blocks 102 so that they extend transversely therefrom. The first set of working station lock assemblies 28W is spaced vertically from the second set of working station lock assemblies 28W' to allow two mold plates to be secured simultaneously at the working station W. Each set of assemblies 28W and 28W' has a forward pair of assemblies and a rearward pair of assemblies, where one lock assembly in the pair is coupled to the opposing guide block.

The second and third pair of guide blocks 104 and 106 each have a pair of intermediate and end loading lock assemblies 28IL and 28EL, which are vertically coupled to extensions on the guide blocks. The lock assemblies 28IL and 28EL secure various plates thereabove in the intermediate or end loading station, respectively.

Figure 7:
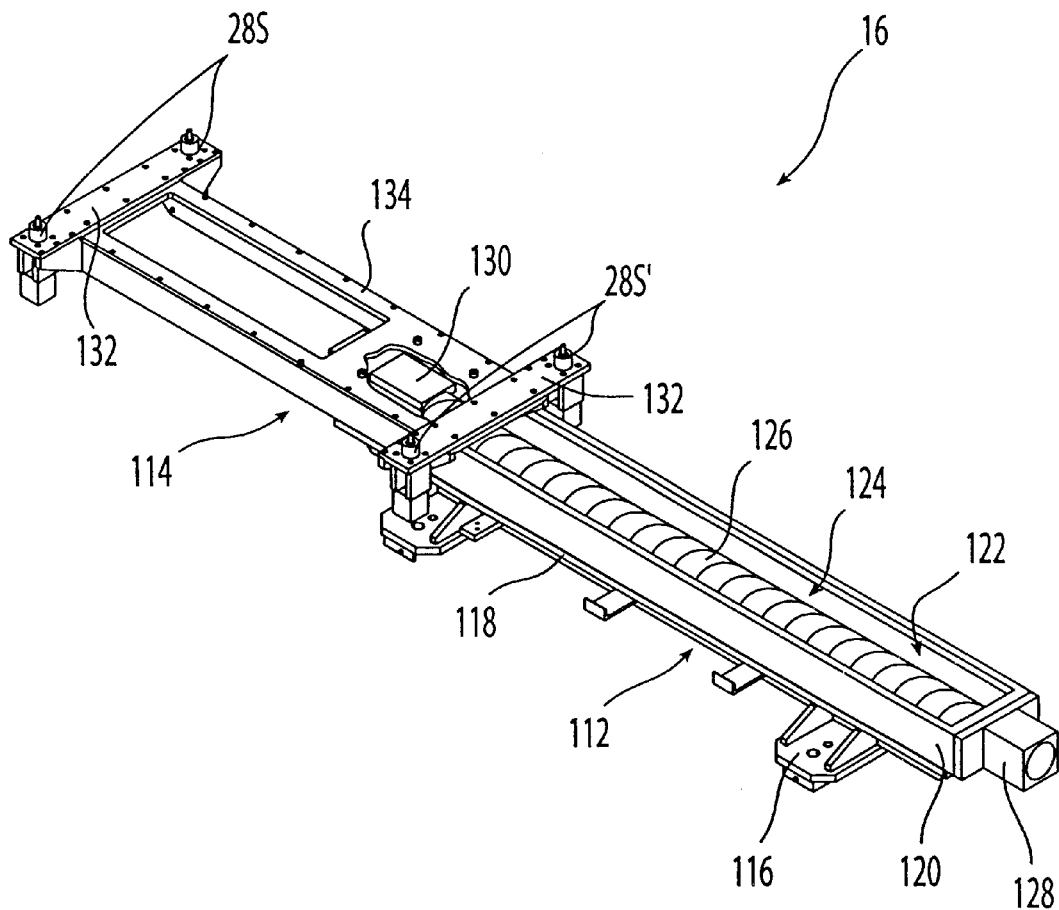
FIG. 7 is an enlarged, perspective view of a slide assembly of the apparatus.

Referring to FIGS. 5–7, the slide assembly 16 transports the mold plates longitudinally along the slide frame 38 between the various stations W, IL and EL. The slide assembly 16 includes a base assembly 112, a sliding member 114, and a plurality of slide lock assemblies 28S and 28S'.

Referring to FIG. 7, the base assembly 112 includes two spaced support feet 116, a floor member 118, and a rectangular side wall member 120. When the slide assembly 16 is assembled to the slide frame 38, the support feet 116 are connected to the central, upper transverse members 48 (as shown in FIG. 5). The floor member 118 extends horizontally between the support feet 116 and is connected thereto. The rectangular side wall member 120 is coupled to the floor member 118 and extends vertically therefrom. The side wall member 120 forms a chamber 122 that receives a motorized linear slide 124. The linear slide 124 causes the sliding member 114 to move longitudinally. One recommended linear slide is commercially available from Thomson Industries Inc. located in Fort Washington, N.Y. and called AccuSlide. However, any conventional motorized slide known to those skilled in the art can be used. Other types of components can also be used to move plates longitudinally instead of the linear slide, such as a belt drive.

The linear slide 124 has a ball screw 126 operatively connected to a servo motor 128. The servo motor 128 is connected to a first end of the side wall member 120 for driving the ball screw 126. A ball bushing bearing 130 is operatively connected to and travels along the ball screw 126 and is coupled to the sliding member 114.

The sliding member 114 is H-shaped and includes two spaced mounting plates 132 joined by a plate 134. The slide lock assemblies 28S and 28S' are coupled to the ends of the mounting plates 132 and releasably couple the mold plates to the sliding member 114.

The sliding member 114 is shown in an extended position, where the sliding member 114 is unaligned with the base assembly 112. Sensors (not shown) are mounted on the base assembly 112 to detect the position of the sliding member 114.

Figure 8:
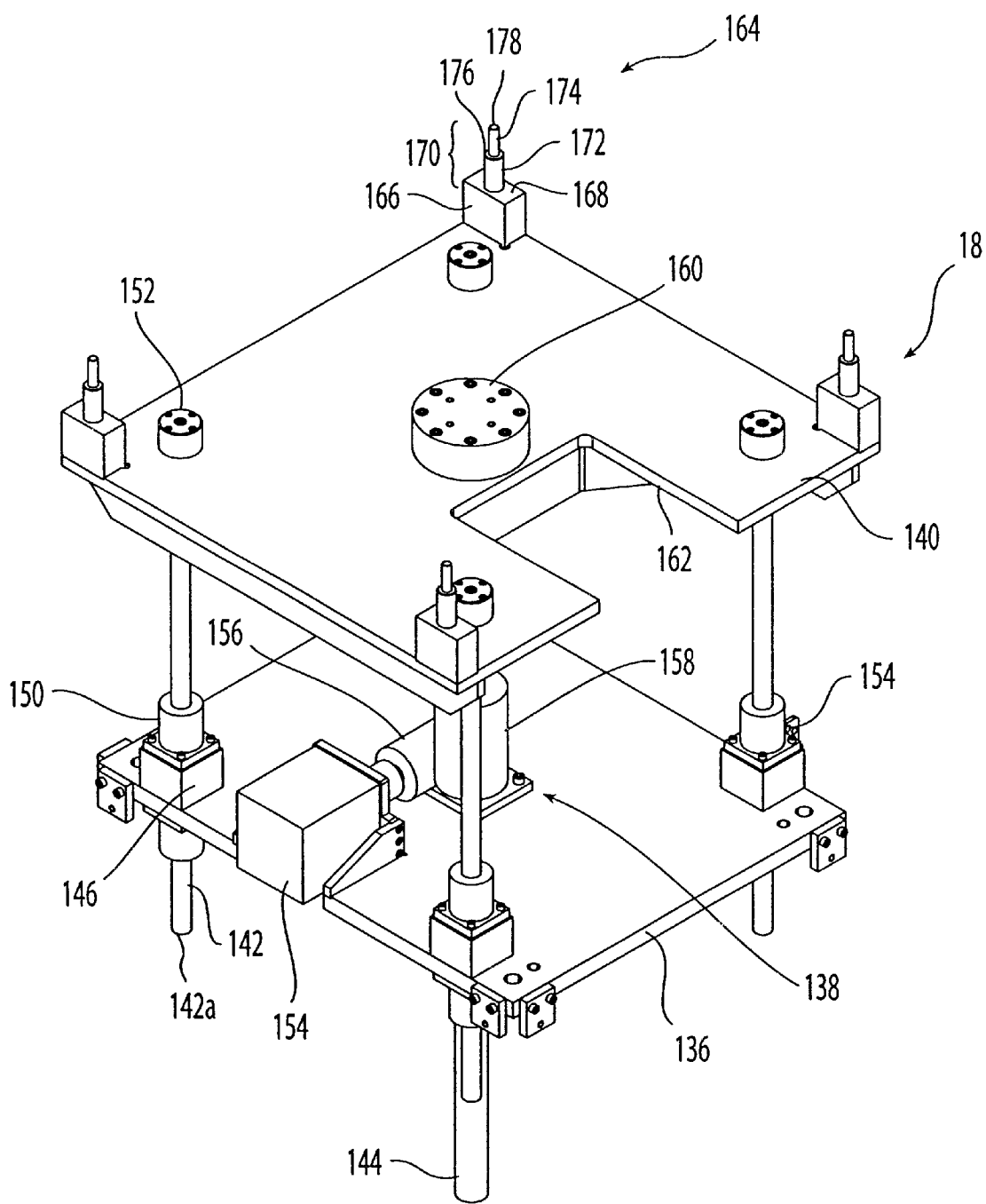
FIG. 8 is an enlarged, perspective view of the lower elevator assembly of the apparatus of FIG. 3.

Referring to FIGS. 4 and 8, the lower elevator assembly 18 includes a lower plate 136, an actuation assembly 138, and a movable, upper plate 140. The lower plate 136 is connected to the slide frame 38 within the elevator frame 40. Each of the lower and upper plates 136 and 140 define first holes (not shown) at the corners for receiving guide rods 142. Each of the plates also define a second hole (not shown) at the center of each plate for receiving a central shaft 144.

The upper surface of the lower plate 136 further includes four ball bushing blocks 146. The blocks 146 are at the corners for receiving the rods 142. Each ball bushing block 146 has a bushing 150 secured thereto for receiving each guide rod 142 and allowing smooth vertical movement of the guide rods 142 through the block 146 and lower plate 136. When each guide rod 142 is disposed through the first holes and bushing blocks, the first end 142a of each guide rod 142 is below the lower plate 136 and the second end of each guide rod 142 receives a top cap 152 for fixedly connecting the guide rod 142 to the upper plate 140.

One of the ball bushing blocks 146 includes a home sensor 154 mounted thereto to indicate when the upper plate 140 is in a lower position. An upper limit sensor (not shown) is mounted in the elevator frame 40 (as shown in FIG. 4) at the rotate or central position to indicate the upper limit of the top plate 140 of the lower elevator assembly 18. The top plate 140 moves between a lowest position beneath the level of the guide blocks 102 (as shown in FIG. 6) and the rotate position.

The actuation assembly 138 for moving the upper plate 140 vertically includes a servo motor 154 and a jack screw 156. The servo motor 154 is connected to the lower plate 136 and operatively connected to the jack screw 156. The central shaft 144 has a first end 144a beneath the lower plate 136 and a second end above the upper plate 140. A shaft coupling 158 operatively connects the jack screw 156 to the central shaft 146. A screw cap 160 is connected to the second end of the central shaft 144 to fixedly couple the central shaft 144 to the upper plate 140.

The upper plate 140 defines a cutout 162 and includes a plurality of lift elements 164. As shown in FIG. 3, once the lower elevator 18 is installed, cutout 162 is aligned with the slide assembly 16 to allow the upper plate 140 to move without the slide assembly 16 interfering with the movement of the upper plate.

Referring again to FIG. 8, the lift elements 164 are disposed at each corner on the upper surface of the upper plate 140. The lift elements 164 engage the mold plates, upon vertical movement of the upper plate 140 to separate the plates from one another.

Referring to FIG. 8, each lift element 164 includes a block 166 having an upper surface 168, and a lift pin 170 extending vertically therefrom. Each lift pin 170 includes a cylindrical base portion 172 and a cylindrical upper portion 174. The diameter of the base portion 172 is larger than the diameter of the upper portion 174. The base portion 172 and the upper portion 174 are separated by a shoulder 176. Each pin further includes a free end 178.

Figure 9:
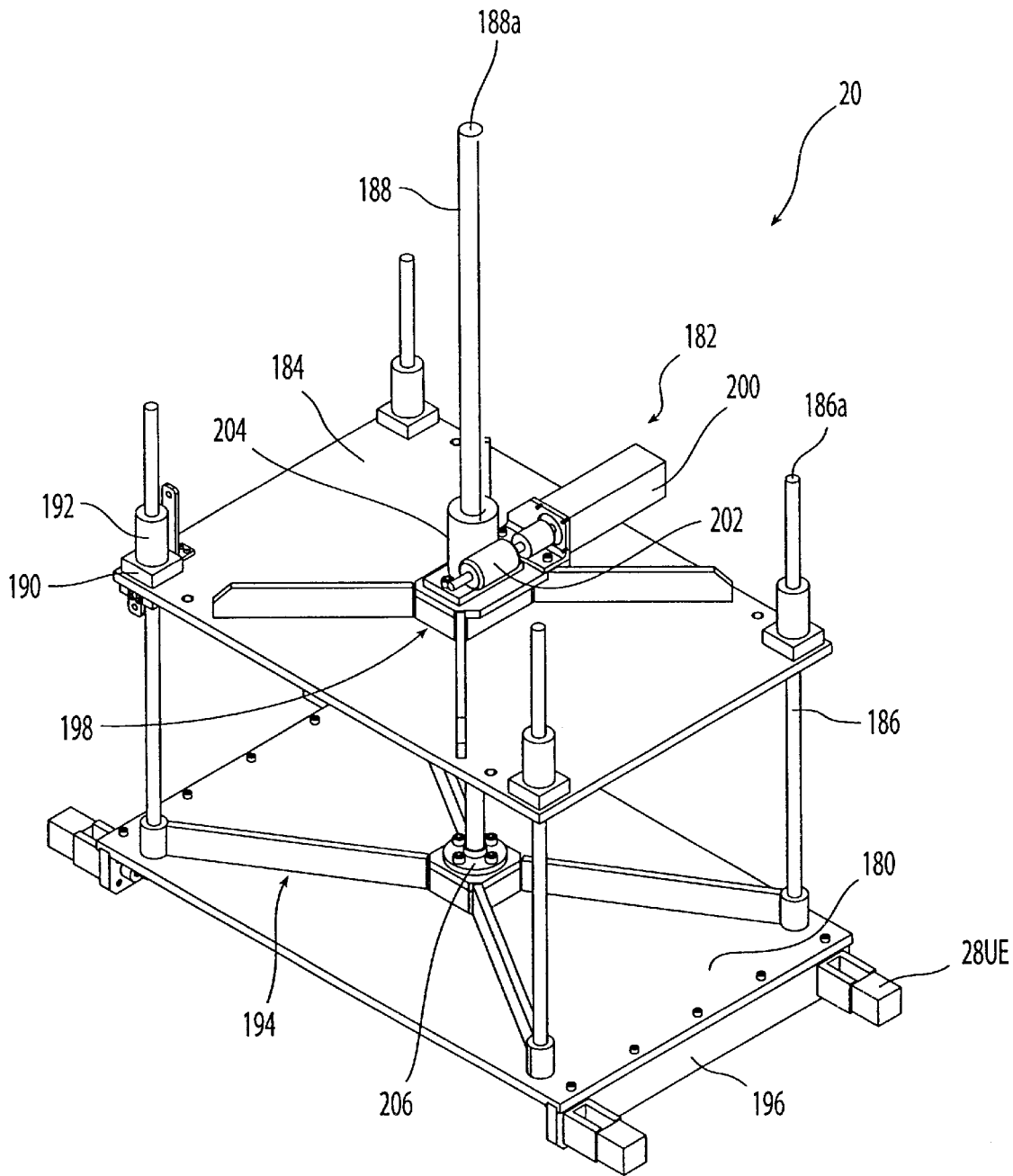
FIG. 9 is an enlarged, perspective view of an upper elevator assembly of the apparatus of FIG. 3.

Referring to FIG. 9, the upper elevator assembly 20 includes a movable lower plate 180, an actuation assembly 182, and an upper plate 184. The upper plate 184 is connected to the support members 88 and 90 (as shown in FIG. 5) within the elevator frame 40.

Each of the lower and upper plates 180 and 184 define first holes (not shown) at the corners for receiving guide rods 186. Each of the plates also define a second hole (not shown) at the center of each plate for receiving a central shaft 188. The upper surface of the upper plate 184 further includes four ball bushing blocks 190 at the corners for receiving the rods 186. Each ball bushing block 190 has a bushing 192 secured therein for receiving each guide rod 186 and allowing smooth vertical movement of the guide rods 186 through the block 190 and lower plate 180.

When the guide rod 186 is disposed through the first holes and the bushing blocks, the first end 186a of each guide rod 186 is above the upper plate 184. The second end of each guide rod 186 receives a cap (not shown) for fixedly connecting the guide rod 186 to the lower plate 180. One of the ball bushing blocks 190 includes a home sensor (not shown) mounted thereto to indicate when the lower plate is in an elevated or home position. A lower limit sensor (not shown) is mounted in the elevator frame 40 (as shown in FIG. 5) at the rotating position to indicate the lower limit of the lower plate of the upper elevator assembly.

The upper surface of the lower plate 180 includes braces 194 with an X-shape for adding rigidity to the lower plate 180. The lower plate 180 further includes two spaced, parallel, end walls 196 connected thereto, which extend vertically below the lower surface of the lower plate 180. Each end wall 196 has a pair of upper elevator lock assemblies 28UE attached thereto to releasably secure the center mold plate 34 (as shown in FIG. 4) to the upper elevator 20.

The upper surface of the upper plate 184 includes braces 198 with an X-shape for adding rigidity to the upper plate. The upper surface also has the actuation assembly 182 disposed thereon. The actuation assembly 182 includes a servo motor 200 and a jack screw 202 for moving the lower plate 180 vertically. The servo motor 200 is connected to the upper plate 184 and operatively connected to the jack screw 202. The central shaft 188 has a first end 188a above the upper plate 184 and a second end (not shown). A shaft coupling 204 connects the jack screw 202 to the central shaft 188. A bracket 206 is connected to the second end of the central shaft 188 to connect the central shaft 188 to the lower plate 180.

Figure 10A:
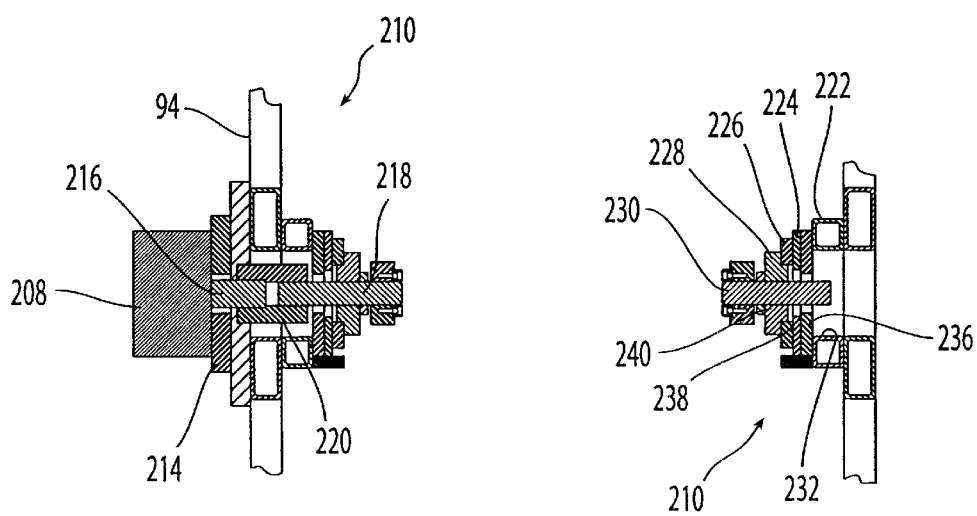
FIG. 10A is an enlarged, partial, cross-sectional view of a rotating assembly taken along arrow 10A—10A of FIG. 10.

Referring now to FIGS. 10 and 10A, the rotating assembly 22 is mounted to the rotating mount frame 80. The rotating assembly 22 includes an actuator assembly 208, a pair of rotating subassemblies 210, and a rotating frame 212. The rotating assembly 22 is located within the elevator frame 40 so that the rotating frame 212 can rotate within the elevator frame 180° between an upright and an inverted position. To that end, the elevated position of the center mold plate, as discussed below, is spaced from the rotating position more than half the width of the rotating frame to allow rotation of the frame.

The actuator assembly 208 is connected to a mount plate 214 that is coupled to the outside of the first pair of longitudinally extending mount members 94. The actuator assembly 208 has a cylindrical shaft 216 that extends through the mount plate 214. The actuator assembly 208 is a conventional air/oil tandem rotary actuator available from PHD Inc. However, other components that impart rotary motion can be used. The shaft 216 is coupled to a first pivot shaft 218 by a bore coupling 220. When the shaft 216 rotates, the first pivot shaft 218 also rotates. The rotation is about a rotate axis $R_A$. The pair of rotating subassemblies 210 are mounted to the inside of the longitudinally extending mount members 94 on either side of the elevator frame. Each subassembly 210 includes a mount frame 222, a horizontal adjustment plate 224, a vertical adjustment plate 226, a bearing 228, and a second pivot shaft 230.

The mount frame 222 is coupled to the inside of one of the mount members 94. As best shown in FIG. 5, the mount frame defines a central bore 232 for receiving the associated shaft 218 or 230. The mount frame 222 also includes an outwardly extending shelf 234 for supporting the other components of the rotate assembly.

Referring to FIG. 10A, the horizontal adjustment plate 224 defines a central hole 236 and is mounted adjacent to the mount frame 222. The horizontal adjustment plate 224 is rectangular and also defines four horizontal slots (not shown) to accommodate screws and allow for horizontal adjustment of the pivot assemblies. The central hole 236 has a sufficiently large diameter to permit the second pivot shaft 230 with a smaller diameter to enter therein.

The vertical adjustment plate 226 defines a central hole 238 and is mounted adjacent to the horizontal adjustment plate 224. The vertical adjustment plate 226 is rectangular and defines four vertical slots (not shown) to accommodate screws and allow for vertical adjustment of the pivot assemblies. The central hole 238 has a sufficiently large diameter to permit the second pivot shaft 230 to enter therein and to receive the bearing 228.

The bearing 228 has a central hole 240 for receiving and supporting the first and second pivot shafts, respectively, and allowing rotation of the shafts. The combination of the horizontal and vertical adjustment plates 224 and 226 permits the adjustment of the bearing 228 to concentrically align with the first and second pivot shafts 218 and 230 during installation of the rotating frame 212. The pivot shaft 218 and 230 are coupled to opposite sides of the rotating frame 212 (as best shown in FIG. 11).

Referring to FIG. 8, the rotating frame 212 includes a pair of longitudinally extending side members 242a and 242b and a pair of transversely extending end members 244 fastened together to form a substantially square frame. The side members 242a and 242b include two sets of frame locking assemblies 28F and 28F' secured thereto. The first set of locking assemblies 28F is vertically spaced from the second set of locking assemblies 28F' so that the rotating frame 212 can support two mold plates. The first set of locking assemblies 28F has two spaced assemblies at either end of the side members 242a, and two spaced assemblies at either end of the side members 242b. The second set of locking assemblies 28F has two spaced assemblies at either end of the side members 242a, and two spaced assemblies at either end of the side members 242b.

Figure 11:
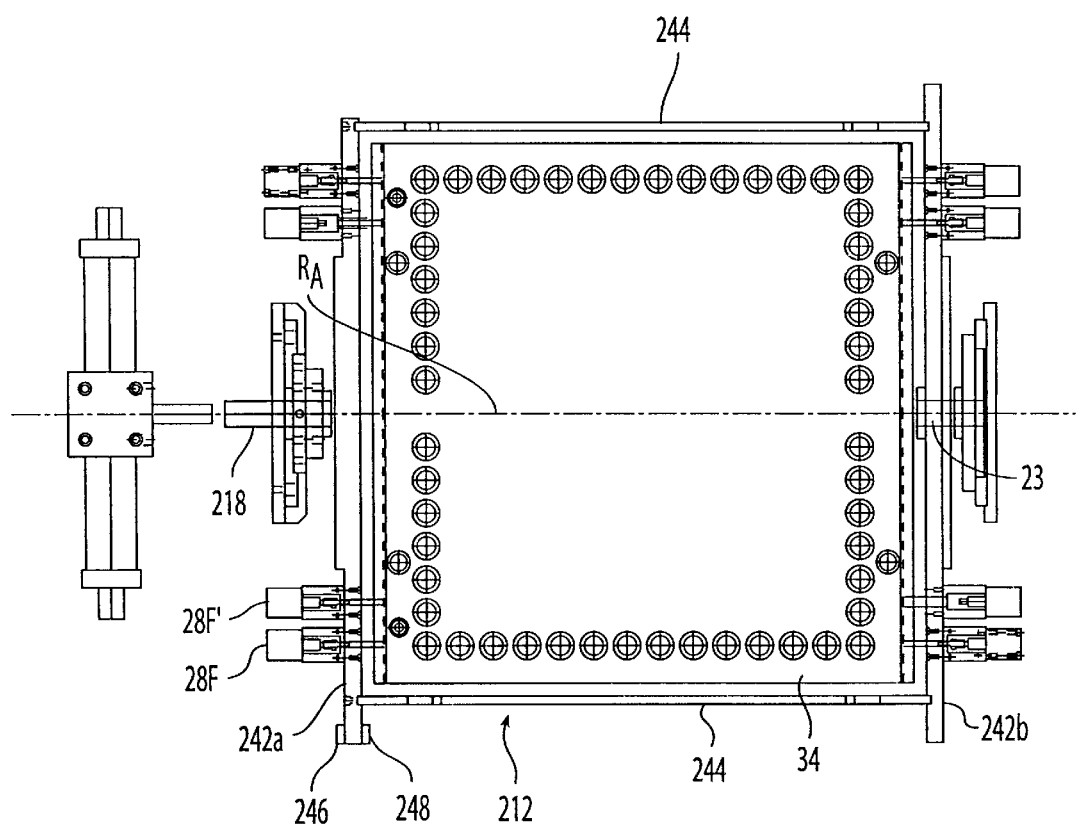
FIG. 11 is an enlarged, partial, top view of the rotating assembly of FIG. 10A with a top mold plate retained therein.

As shown in FIGS. 10 and 11, one end of one of the side members 242a includes a cushion block 246 and a sensor block 248. The cushion and sensor blocks 246 and 248 are attached to opposite sides of the side member 242a. The cushion block 246 is positioned so that when the rotating frame is horizontal, the cushion block 246 contacts the hydraulic cushion 86 to prevent excess rotation of the rotating frame 212. The sensor block 248 senses when the cushion block 246 contacts the hydraulic cushion 86 to send a signal to the controls to stop rotation of the rotating frame 212.

Referring to FIG. 10, the end members 244 are horseshoe-shaped, and each has corner guide blocks 250 secured thereto. The corner guide blocks 250 align the rotating frame 212 with the lower elevator assembly 18 (as shown in FIG. 3) during operation.

Referring to FIG. 3, light source 24 and sensors 26 are mounted on each sensor array support 96. The light source 24 produces a light beam. The sensors 26 receive the light beam. If the sensors 26 do not receive the light beam, a circuit is not completed and a signal is sent to the controls. The purpose of the light source and sensors is to determine if any material is on the center mold plate 34 (as shown in FIG. 4), and discussed below.

Figure 12:
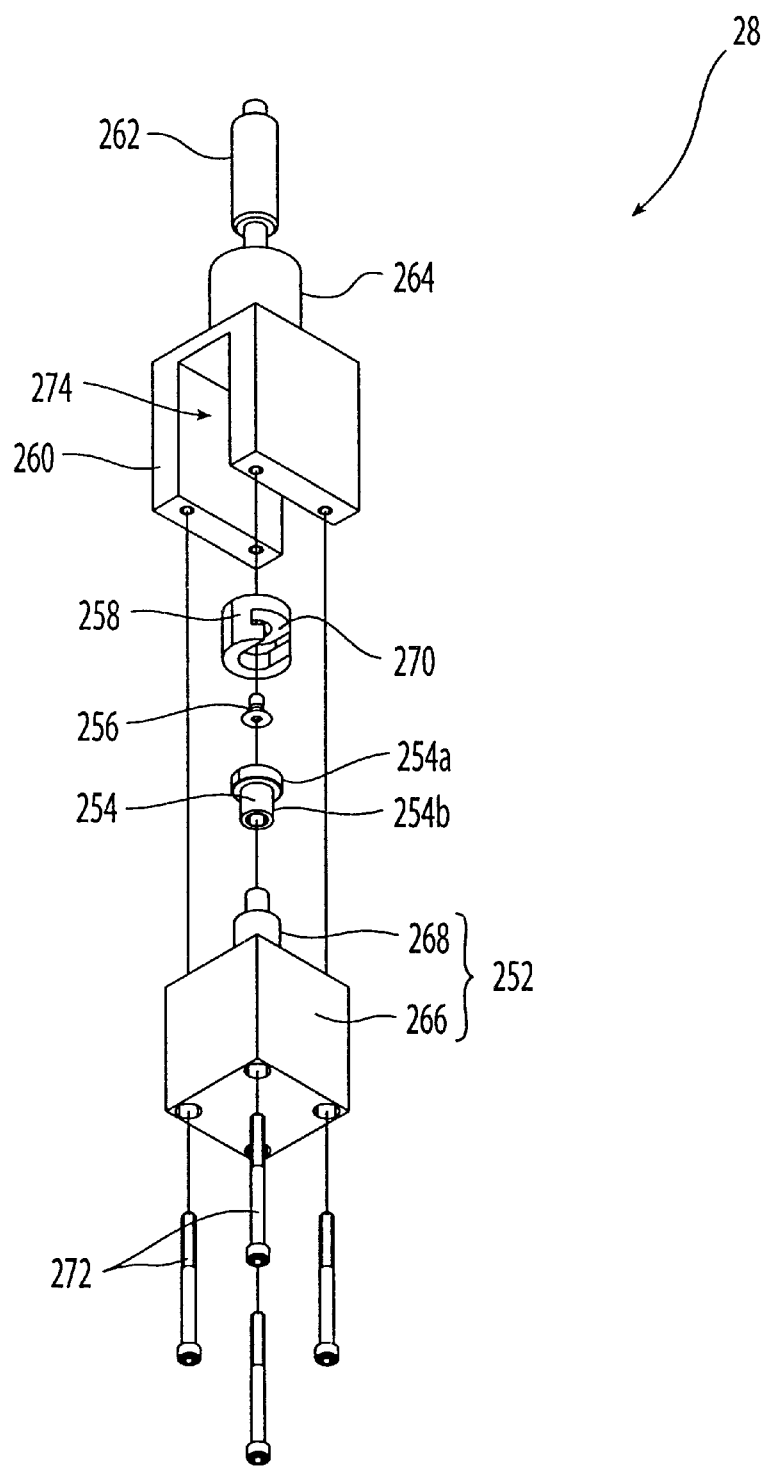
FIG. 12 is an exploded, enlarged, perspective view of a lock assembly of the apparatus of FIG. 3.

Referring to FIGS. 6, 7, 9, 11, the working station lock assemblies 28W and 28W', the loading station lock assemblies, 28IL and 28EL, the slide lock assemblies 28S and 28S', the upper elevator lock assemblies 28UE, and the frame lock assemblies 28F and 28F' will now be discussed. Referring to FIG. 12, each lock assembly mentioned above includes an air cylinder assembly 252, a cylinder nose 254, a connector 256, a floating coupling 258, a lock body 260, a pullout dowel 262, and a bronze bushing 264.

The air cylinder assembly 252 includes a bracket housing 266, an air cylinder 268, and an air cylinder valve (not shown) for activating the air cylinder 268. The air bracket housing 266 slidably receives the air cylinder 268, and the air cylinder 268 extends therefrom.

The cylinder nose 254 is connected to the free end of the air cylinder 268. The cylinder nose 254 has a large diameter portion 254a and a small diameter portion 254b. The large diameter portion 254a of the cylinder nose is disposed within the notch 270 defined in the floating coupling 258 to secure the nose 254 to the coupling 258.

The lock body 260 is coupled to the air cylinder assembly 252 by fasteners 272 and defines a central slot 274. The bronze bushing 264 is secured to the opposite side of the lock body from the slot 274. The pullout dowel 262 is slidably connected to the lock body 260 by the bushing 264. The floating coupling 258 is, in turn, operatively connected to the pullout dowel 262 by the connector 256. The slot 274 of the lock body 260 houses the connector 256, the cylinder nose 254, and floating coupling 258.

During operation of the lock assemblies 28, the air cylinder 268 extends or retracts by actuation of the air cylinder valve. Consequently, movement of the cylinder 268 also causes the pullout dowel 262 to extend or retract so that the pullout dowel 262 engages and releases the various mold plates.

Figure 13:
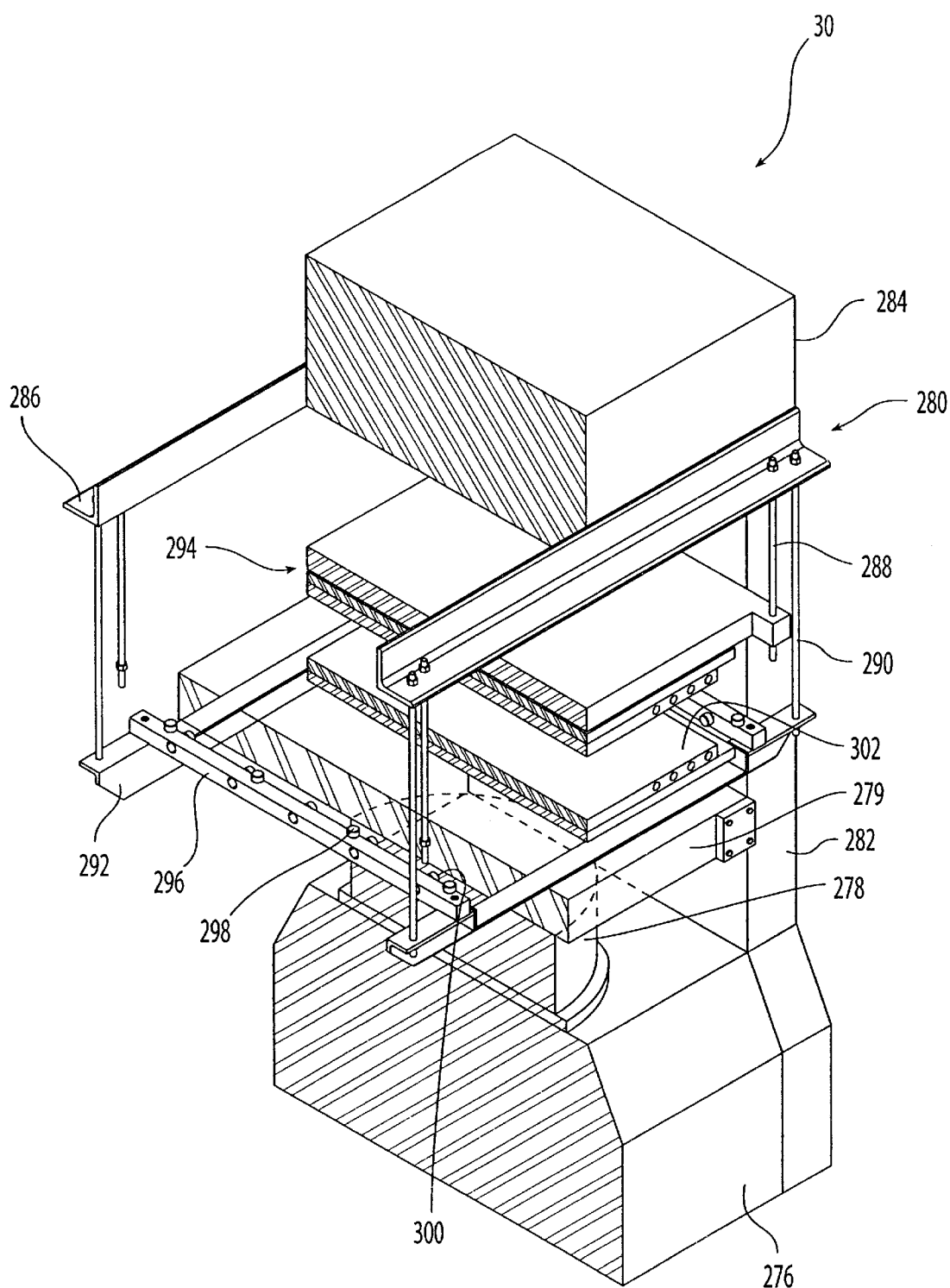
FIG. 13 is an enlarged, perspective view of a mold press of the apparatus of FIG. 3, wherein portions are broken away for clarity.

Referring to FIG. 13, the mold press 30 is a hydraulic press commercially available from Brodeur Machine Company of New Bedford, Mass. under the name "slab-sided ram" hydraulic press. However, any mold press that is capable of producing the needed heat and pressure can be used. The mold press 30 has a base 276, a press ram 278, and a mold support assembly 280.

The base 276 includes two side slabs (one slab 282 being shown) that extend vertically to a top block 284. The press ram 278 is located on the base 276 and moves a platen 279 to produce the pressure during molding. The press ram also supports various other moving platens, a steam platen, heating/cooling platens and insulation, as known by these of ordinary skill in the art.

The mold support assembly 280 includes two support brackets 286 connected to the mold frame (not shown), pairs of support rods 288 and 290, and a movable frame 292. Each bracket 286 has the pair of first support rods 288 and a pair of second support rods 290 attached thereto. The first support rods 288 support an upper press plate 294. The second support rods 290 support the frame 292 including a pair of spaced guide blocks 296. The guide blocks 296 have cam-follower bearings 298 and 300 that are similar to those used with the guide blocks of the guide assembly 14 (as shown on FIG. 6).

When the press ram 278 moves vertically, the platen 282 and frame 292 move vertically. The second support rods 290 guide the movement of the frame 292. The upper press plate 294 horizontally spans the mold press 30 above the frame 292. A lower press plate 302 horizontally spans the mold press and is supported by the frame 292.

Referring to FIG. 4, the bottom mold plate 32, the top mold plate 34, and the center mold plate 36 will now be discussed in detail. The bottom and top mold plates 32 and 34 include a plurality of hemispherical mating cavities 304 that form a sphere when the center mold plate 36 is not disposed between them. The cavities 304 are formed directly in the mold plates or comprised of replaceable mold cavities as set forth in U.S. Pat. No. 4,508,309 issued to Brown. The cavities 304 are formed with a radius substantially equal to the finished core radius. Preferably, this is in the range of about 1.50 inches to 1.65 inches as set forth above. Surrounding each of the cavities 304 is a circumferential groove 306 (as shown in FIGS. 14 and 15) for surplus outer core material.

The center mold plate 36 includes a plurality of protrusions 307 on opposite sides thereof that correspond with the cavities 304 of the top and bottom mold plates. The protrusions 307 are hemispheres, which are substantially the same size as half of the ball inner core13 (as shown in FIGS. 1–2), as set forth above.

Figure 14:
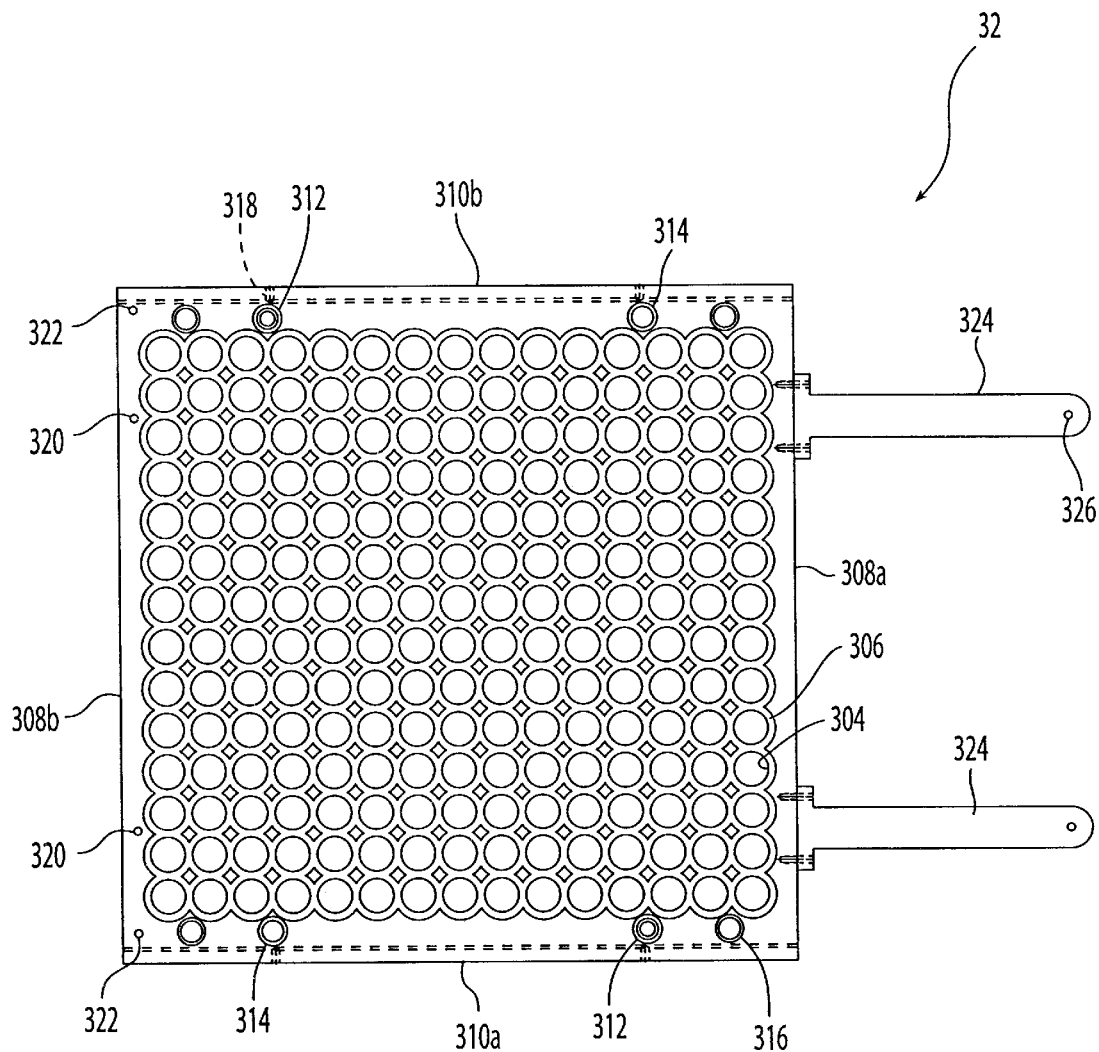
FIG. 14 is an enlarged, top view of the bottom mold plate shown in FIG. 4.
Figure 15:
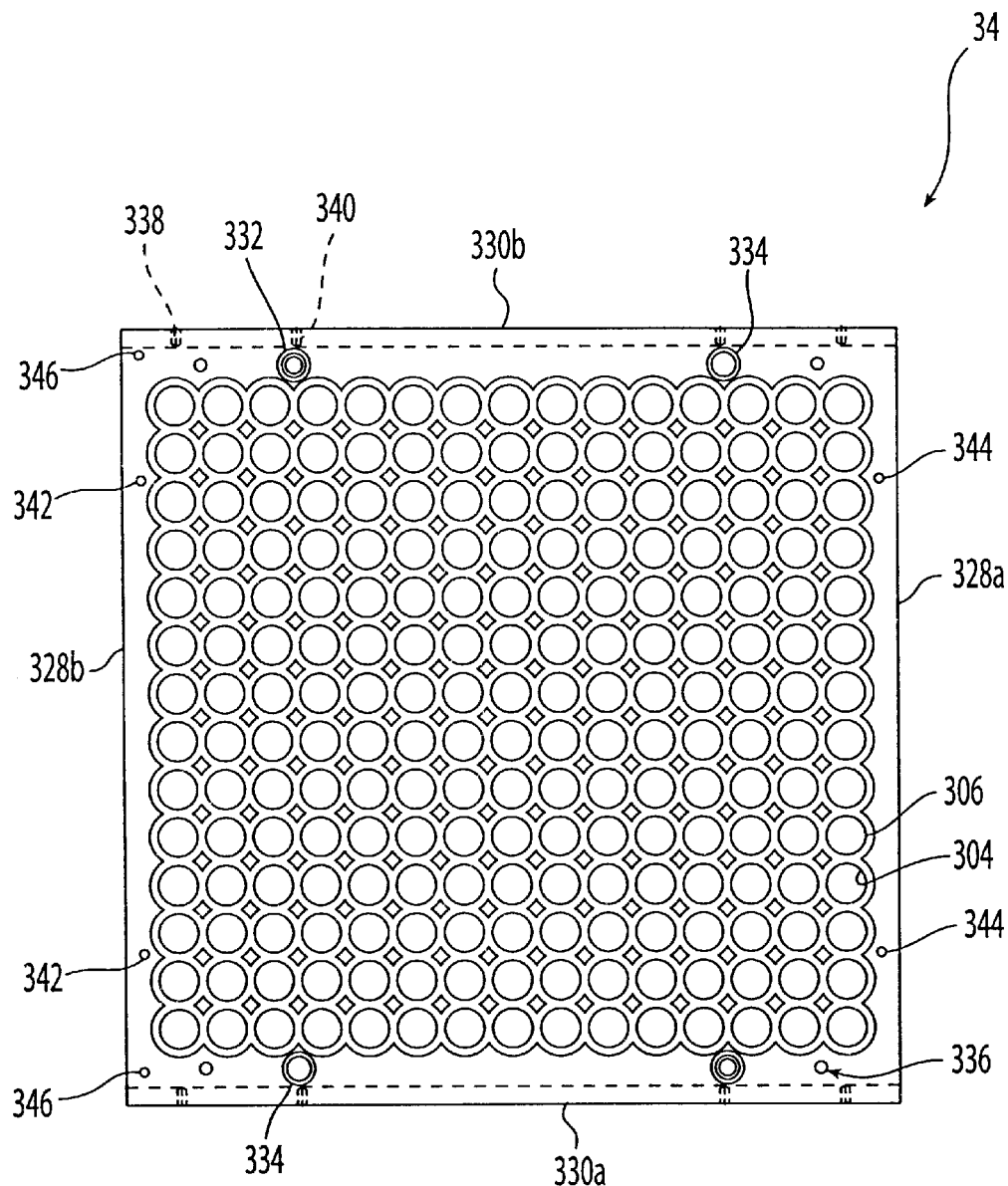
FIG. 15 is an enlarged, top view of the top mold plate shown in FIG. 4.

Referring to FIGS. 4 and 14, the bottom mold plate 32 further includes two spaced, transversely extending, side walls 308a and 308b, two spaced, longitudinally extending, side walls 310a and 310b, a pair of alignment pins 312, a pair of alignment apertures 314, four lift apertures 316, four side lock apertures 318, two forward slide apertures 320, two forward lock apertures 322, and two arms 324.

The alignment pins 312 are located diagonally across from each other adjacent to the two longitudinally extending side walls 310a and 310b. The alignment apertures 314 are defined diagonally across from each other adjacent to the two longitudinally extending side walls 310a and 310b. The alignment pins 312 and apertures 314 are vertical.

Referring to FIGS. 4 and 14, the lift apertures 316 extend vertically through the plate adjacent to the two longitudinally extending side walls 310a–b. The lift apertures 316 receive the lift pins 170 of the lower elevator assembly 18. The diameter of the lift apertures 316 is less than the width W of the blocks 166 and greater than the diameter of the upper portion 174 of the pin.

Referring to FIG. 14, the side lock apertures 318 are defined in the longitudinal side walls 310a–b of the bottom plate and extend transversely. The side lock apertures 318 are for engagement of the working station lock assemblies 28W (as shown in FIG. 6).

The forward slide apertures 320 are defined through the plate adjacent to the transverse side wall 308b and extend vertically. The forward slide apertures 320 are for engagement of slide lock assemblies 28S (as shown in FIG. 7).

The forward lock apertures 322 are defined through the plate adjacent sidewall 308b and extend vertically. The forward lock apertures 322 are for engagement of the loading station lock assemblies 28IL and 28EL (as shown in FIG. 6).

The arms 324 extend horizontally from the transverse side wall 308a, and are attached to side wall 308a with conventional fasteners. The arms 324 define rear slide apertures 326 vertically therethrough at the free ends. The arms 324 are spaced apart so that the rear slide 6 apertures 326 can be engaged by the slide lock assemblies 28S (as shown in FIG. 7).

Referring to FIGS. 4 and 15, the top mold plate 34 further includes two spaced transversely extending side walls 328a and 328b, two spaced longitudinally extending side walls 330a and 330b, a pair of alignment pins 332, a pair of alignment apertures 334, eight lift notches 336, two sets of side lock apertures 338 and 340, two forward slide apertures 342, two rear slide apertures 344, and two forward lock apertures 346.

The alignment pins 332 are located diagonally across from each other and adjacent to the two longitudinally extending side walls 330a–b. The alignment apertures 334 are defined diagonally across from each other adjacent to the two longitudinally extending side walls 330a–b. The alignment pins 332 and apertures 334 are vertical. Referring to FIGS. 14 and 15, when the top mold plate 34 is inverted over the bottom mold plate 32, the alignment pins 332 on the top mold plate insert into the alignment apertures 314 of the bottom mold plate 32 and the alignment pins 312 of the bottom mold plate 32 insert into the alignment apertures 334 of the top mold plate 34 to position the mold plates relative to each other.

One set of four lift notches 336, as shown, extend vertically, partially through the plate from the upper surface of the plate. These notches 366 are adjacent to the two longitudinally extending side walls 330a–b. The other set of four lift notches (not shown) are disposed on the bottom surface of the plate. The lift notches 336 receive the lift pins 170 (shown in FIG. 4) of the lower elevator assembly 18. The lift notches 336 have a diameter greater than the diameter of the upper portion 74 of the lift pin 170 so that the lift pins are received therein.

Referring to FIG. 15, outer and inner sets of side lock apertures 338 and 340 are defined in the longitudinal side walls 330a–b of the top plate and extend transversely. The side lock apertures 338 and 340 are for engagement of the working station lock assemblies 28W (as shown in FIG. 6) and the frame lock assemblies 28F (as shown in FIG. 7) that are transversely oriented.

The forward slide apertures 342 are defined through the plate adjacent to the transverse side wall 328b and extend vertically. The rear slide apertures 344 are defined through the plate adjacent to the transverse side wall 328a and extend vertically. The forward and rear slide apertures 342 and 344 are for engagement of slide lock assemblies 28S (as shown in FIG. 7).

The forward lock apertures 346 are defined vertically through the plate adjacent to the transverse side wall 328b. The forward lock apertures 346 are for engagement of the intermediate loading station lock assemblies 28IL (as shown in FIG. 6).

Figure 16:
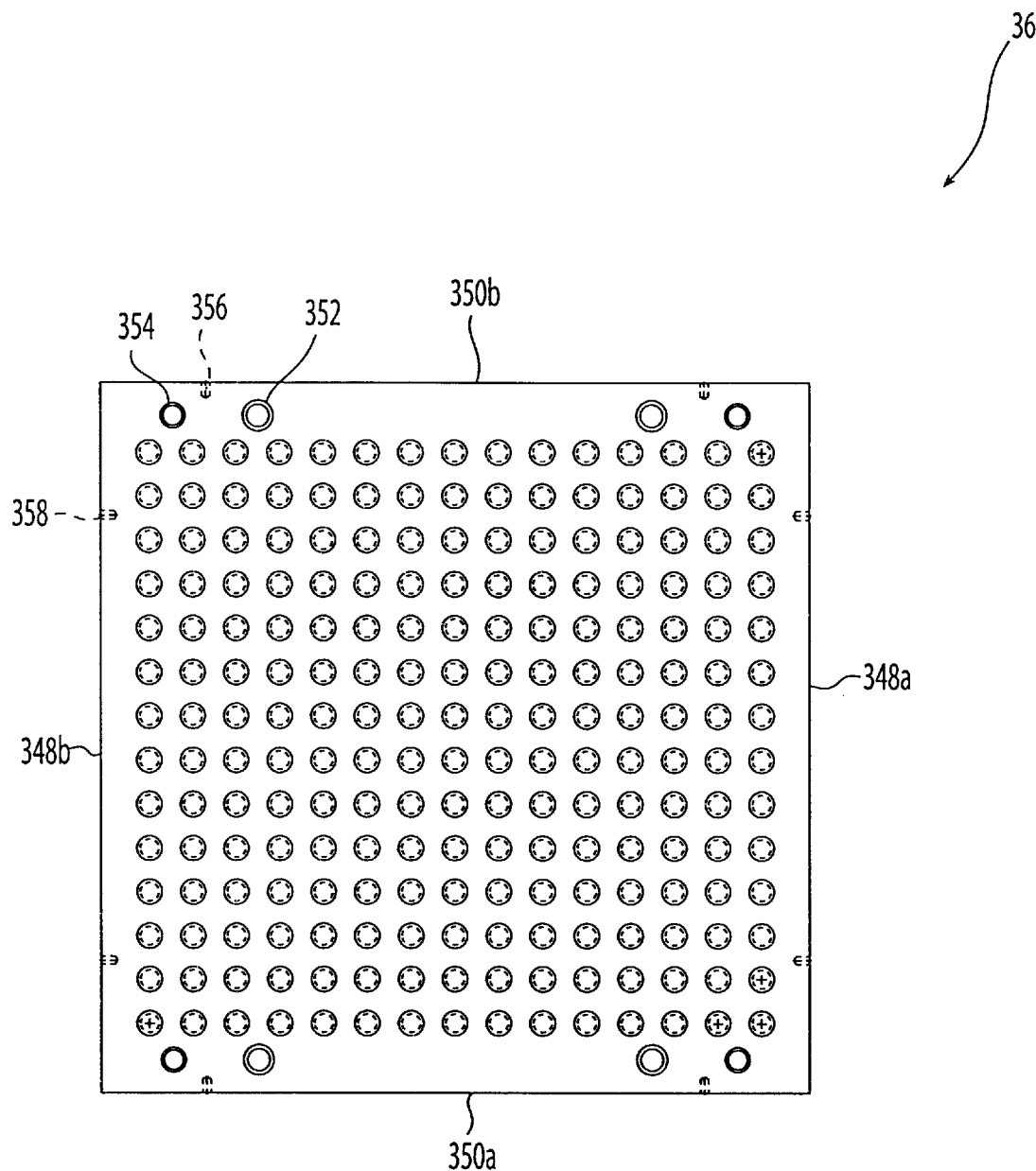
FIG. 16 is an enlarged, top view of a center mold plate shown in FIG. 4.

Referring to FIG. 16, the center mold plate 36 further includes two spaced, transversely extending, side walls 348a and 348b, two spaced, longitudinally extending, side walls 350a and 350b, a set of four alignment apertures 352, four lift apertures 354, and two sets of side lock apertures 356 and 358.

Referring to FIGS. 14 and 16, the alignment apertures 352 are located in rectangular orientation spaced from each other adjacent to the two longitudinally extending side walls 350a–b. The alignment apertures 352 are vertical. When the center plate 36 is disposed between the top and bottom plates 34 and 32, the alignment apertures 352 receive the respective alignment pins 312 and 332 of the top and bottom plates.

Referring again to FIGS. 14 and 16, the lift apertures 354 extend vertically through the plate 36 adjacent to the two longitudinally extending side walls 350a–b. The lift apertures 354 receive the lift pins 170 of the lower elevator assembly 18. The diameter of the lift apertures 354 is less than the diameter of the base portion 172 of the lift pin 170 so that the center plate 36 will rest on the shoulder 176.

One set of side lock apertures 356 are defined in the longitudinal side walls 350a–b of the center plate and extend transversely. The other set of side lock apertures 358 are defined in the transverse side walls 348a–b of the center plate and extend longitudinally. The side lock apertures 356 are for engagement of the frame lock assemblies 28F (as shown in FIG. 11). The side lock apertures 358 are for engagement of the upper elevator lock assemblies 28UE (as shown in FIG. 9).

Figure 17:
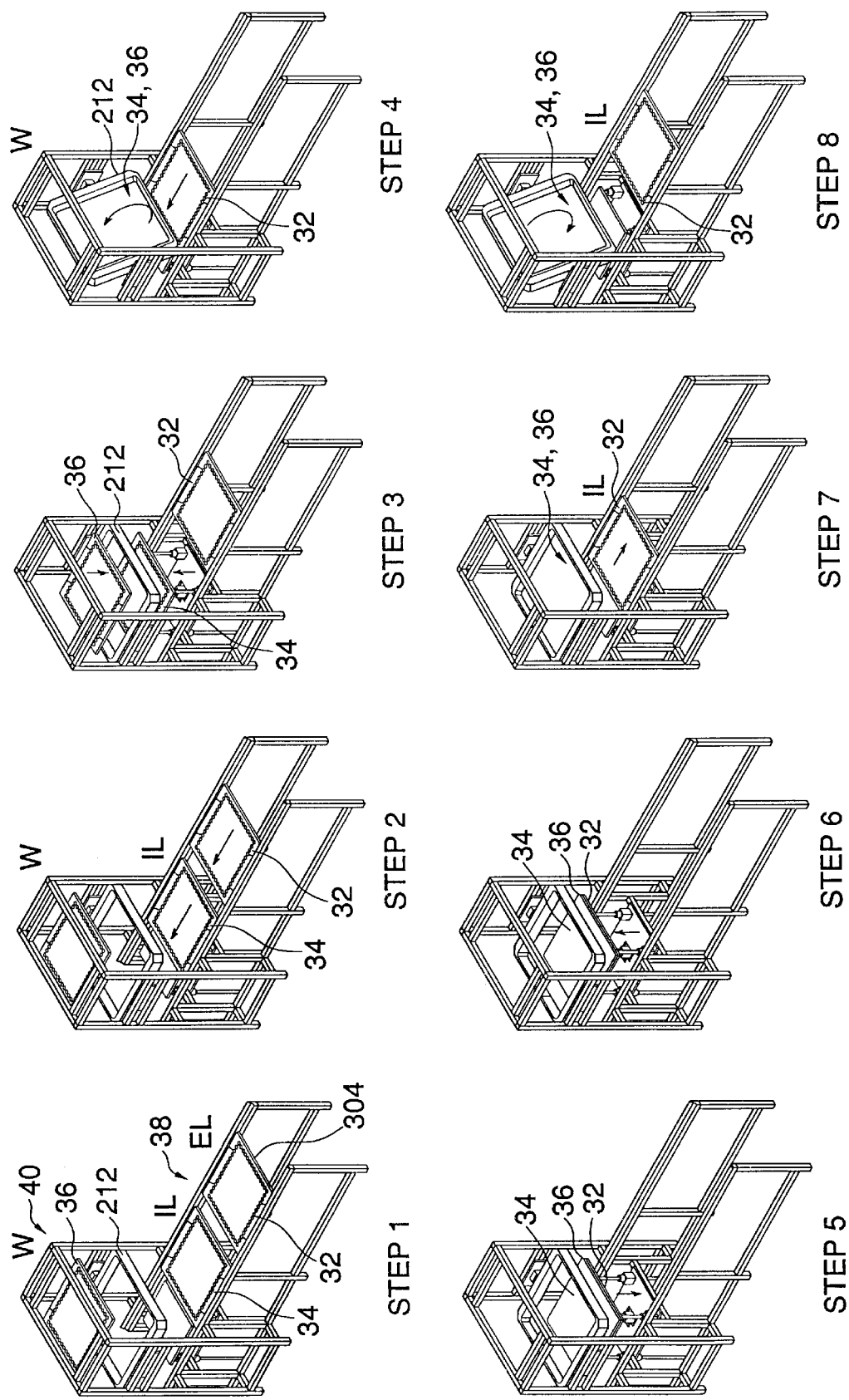
FIGS. 17 and 18 are schematic perspective views illustrating step-by-step the method of forming a two-layer core according to the present invention.

Operation of the molding apparatus will now be discussed. Referring to FIG. 17 (Step 1) and FIG. 3, initially the bottom mold plate 32 is located in the end loading station EL on the slide frame 38, the top mold plate 34 is located in the intermediate loading station IL on the slide frame 38, and the center mold plate 36 is located in the working station W at an elevated position in the elevator frame 40.

The bottom mold plate 32 is held in the end loading station EL by the lock assemblies 2SEL (shown in FIG. 6) engaging the forward lock apertures 322 (shown in FIG. 14). The top mold plate 34 is held in the intermediate loading station IL by the lock assemblies 28IL (shown in FIG. 6) engaging the forward lock apertures 346 (shown in FIG. 15). The center mold plate 36 is held in the working station W by the lock assemblies 28UE (shown in FIG. 9) engaging side lock apertures 358. Referring to FIGS. 9 and 17 (Step 1), the lower plate 180 is position in the elevated position and holds the center mold plate 36 in the elevated position. In these positions, outer core material (not shown), such as polybutadiene, is placed in the cavities 304 (as shown in FIG. 4) of the bottom and top mold plates. The material is in the form of preps or preforms. The rotating frame 212 is upright.

Referring to FIG. 7, the front slide lock assemblies 28S engage the rear slide apertures 344 (as shown in FIG. 15) of the top mold plate 34 and the forward lock apertures 320 (as shown in FIG. 14) of the bottom mold plate 32. The sliding assembly 114 is moved toward the elevator frame 40. As shown in FIG. 17, in Step 2, the top and bottom plates 34 and 32 are moved at the same time. The top plate 34 comes to rest in the working station W and the bottom plate 32 comes to rest at the intermediate loading station IL.

As shown in FIGS. 8, 11, and 15, the lift pins 170 of the lower elevator 18 engage the lower surface lift notches 336 of the top mold plate 34 and the motor 154 via the jack screw 156, rods 142 and shaft 144 raises the upper plate 140 of the lower elevator 18. The upper plate 140 is raised (as seen in FIG. 17, Step 3) from the lower position to the rotating position where it is aligned with the lower set of frame lock assemblies 28F of the rotating frame 212. Once the top mold plate 34 is at the rotating frame 212, the frame locking assemblies 28F engage the set of inner side lock apertures 340 to secure the top mold plate 34 to the rotating frame 212 at the rotating position. The upper plate 140 of the lower elevator 18 returns to the lowest position beneath the level of the slide assembly. The slide assembly 16 (as shown in FIG. 7) moves so that the forward slide lock assemblies 28S are aligned with the forward slide apertures 320 (as shown in FIG. 14) of the bottom mold plate 32.

At the same time in Step 3, the lower plate 180 (as shown in FIG. 9) of the upper elevator 20 moves the center mold plate 34 to the rotating position. Once the center mold plate 34 is aligned with the rotating frame 212, the upper frame locking assemblies 28F' engage the lock apertures 356 (as shown in FIG. 16) of the center mold plate 36 and the locking assemblies 28UE on the upper elevator disengage the plate. Thereafter, the upper elevator 20 moves the lower plate 180 back to the elevated position.

As shown in FIG. 17, (Step 4) the rotating frame 212 rotates 180° and comes to rest inverted. The center and top mold plates 36 and 34 are rotated together. After this rotation the center plate 36 is beneath the top plate 34 so that the preps in the top mold plate cavities are secured therein. At the same time, the slide lock assemblies 28S (as shown in FIG. 7) engage the forward slide apertures 320 (FIG. 14) of the bottom mold plate 32 and move the plate 32 into the working station W. Then, the slide assembly 114 (as shown in FIG. 2) moves until the forward lock assemblies 28S are aligned with the rear lock apertures 326 of the bottom mold plate. Thus, all three plates are vertically aligned, and the center mold plate is between the top and bottom mold plates.

Referring to FIG. 4, the upper plate 140 of the lower elevator 18 rises so that the lift pins 170 extend through the lift apertures 316 in bottom mold plate 32. When the lift block 166 engages the lower surface of the bottom mold plate 32, the bottom mold plate rises with the upper plate 140. The bottom mold plate 32 is elevated until it is beneath the center mold plate 36 in the rotating position. The alignment pins 312 of the bottom mold plate engage the alignment apertures 352 of the center mold plate and the alignment apertures 332 (as shown in FIG. 14) of top mold plate, thereby bringing all three mold plates into alignment.

Referring to FIGS. 4 and 11, the rotating frame locking assemblies 28F and 28F' disengage the center and top mold plates 34 and 36 so that these plates rest on the bottom mold plate 32. Thereafter, the lower elevator upper plate 140 descends (as shown in FIG. 17, Step 5) to return the bottom mold plate 34 to the guide blocks 102 (as shown in FIG. 6). Consequently, all three plates descend. The upper plate 140 then descends to the lowest position.

Now, the assembly is ready for molding. The forward slide assemblies 28S of the slide (as shown in FIG. 7) engage the rear slide apertures 326 on the bottom mold plate 32 (FIG. 14). The slide plate is moved toward the mold press 30 (as shown in FIG. 3) so that the bottom mold plate and the top and center mold plates thereon are transported onto the guide blocks 296 (as shown in FIG. 13) within the mold press 30.

Once the three mold plates are placed into the press 30, they are heated and compressed. Preferably, the mold plates are heated to a first temperature that makes the polybutadiene material significantly more pliable, but is below the cure activation temperature. Preferably, the temperature is greater than about 150° F., but less that the cure activation temperature. The most preferred temperature is between about 190° F. and 220° F. The mold plates are compressed to a pressure sufficient enough to form hemispheres from the polybutadiene material. Preferably, the mold plates are compressed using a hydraulic preforming pressure of about 230 psi. Using for example, a 28 inch diameter ram for the press that produces 142,000 pounds of force on a mold with 210 cavities, the pressure per cavity is about 675 pounds of force per cavity. However, one of ordinary skill in the art can vary the heat and pressure as necessary. The mold plates are then cooled with cooling water that has a temperature between about 60° F. to 100° F. and preferably the cooling water has a temperature of about 80° F. After molding is complete, the forward slide lock assemblies 28S (as shown in FIG. 7) engage the rear slide apertures 326 of the bottom mold plate 32 (as shown in FIG. 14) and return the plates to the working station W.

Referring to FIG. 17 (Step 6), and FIGS. 4 and 14–16, the upper plate 140 of the lower elevator 18 raises to engage the three mold plates and break the mold plates apart. The working station lock assemblies 28W and 28W', engage the bottom and center mold plate side lock apertures 318 and 338. The lifting pins 170 insert into the lift pin apertures 316 and 354 of the bottom and center mold plates respectively. The tip of the lift pins 178 engage the notches 336 of the top mold plate 34 and lift the top mold plate 34 off of the center mold plate 36.

The working station lock assemblies 28W release the center plate and the elevator plate 140 continues upward. The lock apertures 356 of the center plate 36 receive the upper portion 174 of the lift pin, but are too small to receive the base portion 172 of the lift pin so that the center plate 36 rests on the shoulder 176 and is raised above the bottom mold plate 32. The lift apertures 316 of the bottom mold plate 32 receive the base portion 172 of each lift pin and the plate 32 rests on the upper surface 168 of the block 166. The lock assemblies 28W' releases the bottom mold plate.

The upper plate 140 continues to rise until the top and center mold plates are aligned with the respective frame lock assemblies 28F and 28F' at the rotating position. The lock assemblies 28F and 28F' engage the plates and hold the top plate 34 over the center plate 32.

Referring to FIGS. 4 and 6, the upper plate 140 of the lower elevator 18 descends with the bottom mold plate 32 until the bottom mold plate 32 rests on the guide blocks 102. The upper plate 140 continues to descend to the lowest position. The bottom mold plate 32 contains formed outer core hemispheres in the cavities 304.

Referring to FIGS. 7, 14 and 17 (Step 7), the slide lock assemblies 28S engage the forward slide 320 of the bottom mold plate 32 and move it to the intermediate loading station IL. The lock assemblies 28IL (as shown in FIG. 6) engage the forward lock apertures 322 of the bottom mold plate 32 to hold it in the intermediate station IL.

Next in Step 8 (as shown in FIG. 17), the center and top mold plates 36 and 34 are rotated together 180° by the rotating frame 212 until the top plate 34 is between the center and bottom mold plates 32 and 36.

Referring to FIGS. 4, 9, 11, 16, and 18 (Step 9), the lower plate 180 of the upper elevator 20 descends and the lock assemblies 28UE engage the side lock apertures 358 of the center plate 36. The lock assemblies 28F of the rotating frame 212 disengage from the center mold plate 36. The lower plate 180 is moved by the servo-motor 200, jack screw 202, rods 186 and center 188 shaft so that raises the center mold plate 36 to the elevated position again.

Before reaching the elevated position, the lower plate 180 stops so that the tops of the protrusions 307 (as shown in FIG. 4) on the upper surface of the center mold plate 36 are aligned with the light source 24 and sensors 26 (as shown in FIG. 3). The light source 24 generates a light. If the light is not received by the sensors 26, then some elastomeric material is on at least one of the protrusions and an incomplete circuit exists. A signal is sent to the controls and/or operator that the quality of the shells is not satisfactory. If the light is received by the sensors 26, then the cup quality is satisfactory and the circuit is complete. The lower plate 180 continues to rise until the tops of the protrusions 307 on the lower surface of the center mold plate are aligned with the light source 24 and sensors 26. These protrusions are similarly checked for elastomeric material. Simultaneously, the inner cores 13 (as shown in FIGS. 1 and 2) are placed in the hemispheres in the bottom mold plate 32 in the intermediate loading position IL.

Figure 18:
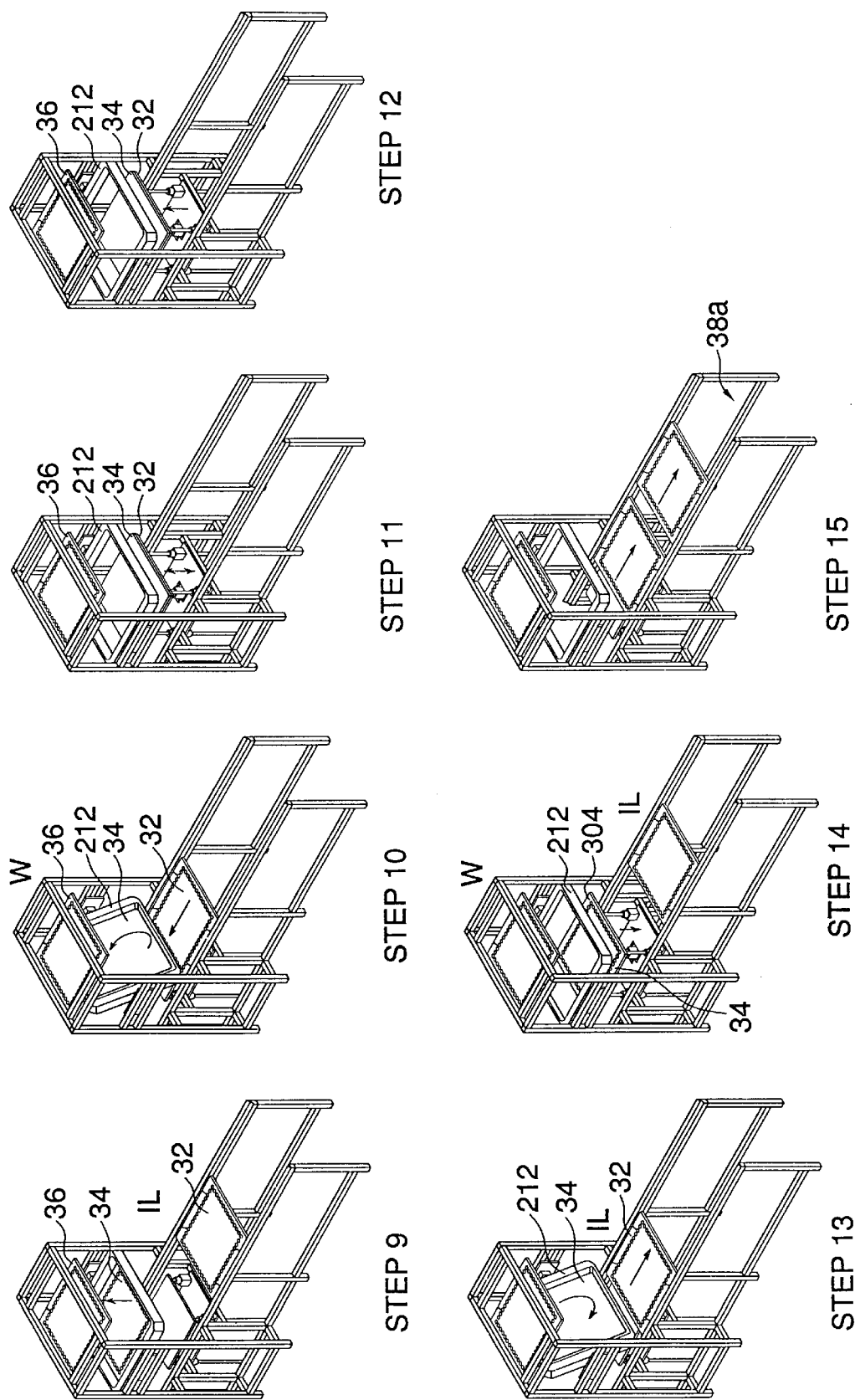

Referring to FIGS. 7 and 18 (Step 10), the rotating frame 212 rotates the top mold plate 34 at 180°. The outer core hemispheres contained in the cavities of the top mold plate remain in the cavities due to the temperature difference between the core material and the plate 34. Depending on the material used the temperature of the core material can be greater than or less than the temperature of the plate and produce the desired result. In this embodiment, the temperature of the core material is lower than the temperature of the plate. At the same time, the slide lock assemblies 28S (as shown in FIG. 7) engage the bottom mold plate forward slide apertures 320 and move the bottom mold plate into the working station W.

Referring to FIGS. 4, 6, and 18 (Step 11), the lower elevator 18 raises the bottom mold plate 32 to the rotating frame 212, in the same manner as previously described in Step 3. The frame locking assemblies 28F release the top mold plate 34. The tip 178 of the lift pins engage the notches 336 of the top mold plate. The upper plate 140 of the lower elevator 18 lowers the bottom and top mold plates 32 and 34 to the guide blocks 102. The lower plate then descends to the lowest position.

Turning to FIGS. 7 and 15, the cores are ready for molding. The forward locking assemblies of the slide 28S engage the rear slide apertures 326 on the bottom mold plate 32. The slide 114 is moved forward so that the bottom mold plate and the top mold plate thereon is transported onto the guide blocks 296 (as shown in FIG. 13) within the molding press 30.

Once the two mold plates are placed into the press 30, they are heated and compressed. This time, the bottom and top mold plates are heated to a temperature above the cure activation temperature of the polybutadiene hemispheres. Preferably, the mold plates are heated to a temperature of greater than about 290° F. Preferably, the mold plates are compressed using a hydraulic preforming pressure of about 2000 psi. Using for example, a 28 inch diameter ram for the press that produces 615.5 tons of force on a mold with 210 cavities, the pressure per cavity is about 6000 pounds of force per cavity. However, one of ordinary skill in the art can vary the pressure.

After molding is complete, the forward slide lock assemblies 28S (as shown in FIG. 7) engage the rear lock apertures 326 (as shown in FIG. 14) of the bottom mold plate 32 and return the plates to the working station W.

Referring to FIGS. 4 and 18 (Step 12), the upper plate 140 of the lower elevator 18 raises and the lift pins 170 separate the top mold plate 34 from the bottom mold plate 32 and both plates are lifted to the rotating frame 212, as previously described. The top mold plate 34 is retained in the rotating frame 52 in the same manner as described before. Thereafter, the upper plate 140 of the lower elevator descends with the bottom mold plate 34 and the finished cores therein.

Referring to FIG. 18 (Step 13), and FIGS. 4, 7, and 14, the rotating frame 212 with the top mold plate 34 retained there rotates the top mold plate 34 180° so that the cavities 304 in the top mold plate are facing upwardly. At the same time, the slide lock assemblies 28S engage the forward slide apertures 320 of the bottom mold plate and the slide assembly 114 moves the bottom mold plate 32 to the intermediate loading station IL.

Turning to FIGS. 4, 6, 15 and 18 (Step 14), the upper plate 140 of the lower elevator 18 raises and the lift pins 170 engage the notches 336 of the top mold plate 34. The rotating frame locking assemblies 28F then release the top mold plate. The upper plate 140 descends with the top mold plate 34 until the top mold plate is on the guide blocks 102 in the working station W. The upper plate 140 continues to descend to the lowest position.

Referring to FIGS. 7, 14, 15, and 18 (Step 15), forward slide lock assemblies 28S engage the rear slide apertures 344 of the top plate 34, and the rear slide lock assemblies 28S' engage the forward slide apertures 320 of the bottom plate 32. As the slide assembly 114 moves toward the first end 38a of the slide frame 38, it moves the top and bottom mold plates 34 and 32. When the slide assembly comes to rest, the top mold plate 34 is in the intermediate loading station IL and the bottom mold plate 32 is in the end loading station EL. The locking assemblies 28IL and 28EL (as shown in FIG. 6) engage the lock apertures 346 and 322, of the top and bottom mold plates respectively. The two-piece cores are removed from the bottom mold plate. Covers are formed on the cores, as discussed above. The process can be repeated to form additional cores.

While it is apparent that the illustrative embodiments of the invention herein disclosed fulfill the objectives stated above, it will be appreciated that numerous modifications and other embodiments may be devised by those skilled in the art, for example, a series of progressively larger diameter shells can be formed and joined by the methods disclosed. This method can also be used to form additional intermediate layers. This method can also be used to form multi-layered cover layers. This method can also be used with a center plate that is moved horizontally from an initial position unaligned with the top plate to a position substantially vertically aligned with the top plate prior to rotating these plates together. The movements of the plates can be varied to achieve the results of the present invention. Therefore, it will be understood that the appended claims are intended to cover all such modifications and embodiments which come within the spirit and scope of the present invention.

What is claimed:

1. A method of making cores, comprising:
   a) providing centers;
   b) providing a plurality of mold plates, a bottom mold plate defining a plurality of cavities, a top mold plate defining a plurality of corresponding cavities, and a center mold plate including a plurality of corresponding protrusions;
   c) forming a plurality of core hemispherical shells from elastomeric material by:
      i) placing elastomeric material in the cavities of the bottom mold plate and the top mold plate;
      ii) locating the top mold plate between the center and bottom mold plates so that the cavities in the top mold plate are adjacent to the center mold plate and the top, center and bottom mold plates are vertically aligned;
      iii) rotating the center mold plate and the top mold plate together until the center mold plate is between the top and bottom mold plates; and
      iv) applying heat and pressure to the three mold plates to form the elastomeric material into the shells in the bottom and top mold plate cavities;
   d) rotating the center mold plate and the top mold plate together until the top mold plate is between the center and bottom mold plates;
   e) placing the centers in the shells in the bottom mold plate;
   f) rotating the top mold plate until the cavities in the top mold plate are adjacent to the centers in the bottom mold plate; and
   g) applying heat and pressure to the top and bottom mold plates to join the shells around the centers to form the cores.

2. The method of claim 1, wherein the step of locating the top mold plate further includes vertically moving the center mold plate from an elevated position to a rotate position.

3. The method of claim 2, wherein the step of locating the top mold plate further includes vertically moving the top mold plate from a lower position to the rotate position.

4. The method of claim 3, further including after the step of applying heat and pressure to the three mold plates, vertically moving the center mold plate from the rotate position to the elevated position, and vertically moving the top mold plate from the rotate position to the lower position.

5. The method of claim 1, wherein the step of locating the top mold plate further includes horizontally moving the center mold plate from a first position substantially vertically unaligned with the top mold plate to a second position substantially vertically aligned with the top mold plate.

6. The method of claim 1, wherein the step of forming a plurality of core hemispherical shells from elastomeric material further includes:
   i) providing a lower elevator having a movable upper plate; and
   ii) after applying heat and pressure to the three mold plates, separating the mold plates by moving the upper plate upward.

7. The method of claim 1, wherein the top mold plate has a plate temperature and after forming the core hemispherical shells the elastomeric material has a material temperature, and the plate temperature is greater than the material temperature.

8. The method of claim 1, wherein the top mold plate has a plate temperature and after forming the core hemispherical shells the elastomeric material has a material temperature, and the plate temperature is less than the material temperature.

9. The method of claim 1, further including:
   a) repeating steps c and d;
   b) placing the cores in the shells in the bottom mold plate;
   c) rotating the top mold plate until the cavities in the top mold plate are adjacent to the cores in the bottom mold plate; and
   d) applying heat and pressure to the top and bottom mold plates to join the shells around the cores to form multi-layered cores.

10. A method of making balls, comprising:
   a) providing cores;
   b) providing a plurality of mold plates, a bottom mold plate defining a plurality of cavities, a top mold plate defining a plurality of corresponding cavities, and a center mold plate including a plurality of corresponding protrusions;
   c) forming a plurality of cover hemispherical shells from a first cover material by:
      i) placing the first cover material in the cavities of the bottom mold plate and the top mold plate;
      ii) locating the top mold plate between the center and bottom mold plates so that the cavities in the top mold plate are adjacent to the center mold plate and the top, center and bottom mold plates are vertically aligned;
      iii) rotating the center mold plate and the top mold plate together until the center mold plate is between the top and bottom mold plates; and
      iv) applying heat and pressure to the three mold plates to form the first cover material into the shells in the bottom and top mold plate cavities;
   d) rotating the center mold plate and the top mold plate together until the top mold plate is between the center and bottom mold plates;
   e) placing the cores in the shells in the bottom mold plate;
   f) rotating the top mold plate until the cavities in the top mold plate are adjacent to the centers in the bottom mold plate;
   g) applying heat and pressure to the top and bottom mold plates to join the shells around the cores to form an assembly; and h) molding a second cover material around the assembly.

11. An apparatus for molding a golf ball including:

a bottom mold plate defining a plurality of cavities;

a top mold plate defining a plurality of corresponding cavities;

a center mold plate including a plurality of corresponding protrusions;

a first frame extending substantially horizontally, said first frame defining a lower position and having the bottom and top mold plates slidably and releasably coupled thereto;

a second frame extending substantially vertically and aligned with the first frame, said second frame defining a rotate position spaced above the lower position and an elevated position spaced above the rotate position; and a rotating frame rotatably connected to the second frame at the rotate position, said rotating frame releasably coupled to at least one of the top and center mold plates to rotate the associated mold plate.

12. The apparatus of claim 11, wherein the elevated position is spaced from the rotating frame a distance and the distance is greater than at least the width of the rotating frame so that the frame can rotate.

13. The apparatus of claim 11, further including:

a lower elevator being disposed within the second frame, said lower elevator having a vertically movable upper plate, wherein the bottom, top and center mold plates being releasably supported on the upper plate;

an upper elevator being disposed within the second frame above the lower position, said upper elevator having a vertically movable lower plate, wherein the center mold plate being releasably coupled to the lower plate; and a mold press disposed adjacent to the first frame for applying heat and pressure to at least two of the plates.

14. The apparatus of claim 11, wherein the first frame further including a guide assembly for supporting the top and bottom mold plates and a slide assembly for moving the top and bottom plates along the first frame.

15. The apparatus of claim 14, wherein the guide assembly further includes a plurality of guide blocks supported by the first frame and two sets of cam-follower bearings rotatably coupled to the guide blocks.

16. The apparatus of claim 15, wherein the first set of cam-follower bearings are rotatably coupled to the upper surface of each guide block and the second set of cam-follower bearings are rotatably coupled to the side surface of each guide block.

17. The apparatus of claim 14, wherein the slide assembly including a linear slide.

18. The apparatus of claim 14, wherein the slide assembly including a belt drive.

19. The apparatus of claim 13, wherein the upper plate of the lower elevator further includes a plurality of lift elements, and each lift element includes a block having a width, and each lift element further including a lift pin connected to the upper surface of the block, and the lift pin has a base portion and an upper portion, where the diameter of the base portion is larger than the diameter of the upper portion.

20. The apparatus of claim 19, wherein the bottom mold plate further includes a plurality lift apertures having locations corresponding to the lift elements, and the diameter of the bottom mold plate lift apertures being less than the width of the blocks and being greater than the diameter of the base portion of the lift pins.

21. The apparatus of claim 19, wherein the center mold plate further includes a plurality lift apertures having locations corresponding to the lift elements, and the diameter of the center mold plate lift apertures being less than the diameter of the base portion of the lift pins.

22. The apparatus of claim 19, wherein the top mold plate further includes a plurality lift notches having locations corresponding to the lift elements, and the diameter of the top mold plate lift notches being greater than the diameter of the upper portion of the lift pins.

23. The apparatus of claim 12, further including a plurality of lock assemblies connected to the rotating frame for releasably coupling the rotating frame to the associated mold plate.

24. The apparatus of claim 23, further including a first set of lock assemblies for releasably coupling to the top mold plate and a second set of lock assemblies for releasably coupling to the center mold plate.

* * * * *